United States Patent [19]
Tajima et al.

[11] Patent Number: 5,371,449
[45] Date of Patent: Dec. 6, 1994

[54] SERVO CONTROL METHOD FOR A SERVO SYSTEM

[75] Inventors: Fujio Tajima; Hideki Tanaka, both of Tsuchiura; Kooetsu Okuyama; Tomokazu Ishii, both of Ibaraki; Kenji Toki, Odawara, all of Japan

[73] Assignee: Hitachi, Ltd., Tokyo, Japan

[21] Appl. No.: 853,947

[22] Filed: Mar. 19, 1992

[30] Foreign Application Priority Data

Mar. 20, 1991 [JP] Japan ................ 3-056338

[51] Int. Cl.$^5$ ........................... G05B 11/01
[52] U.S. Cl. ........................ 318/560; 318/565; 318/567; 318/638; 318/652; 318/636
[58] Field of Search ............ 318/560, 565, 567, 638, 318/652, 636

[56] References Cited
U.S. PATENT DOCUMENTS

| | | | |
|---|---|---|---|
| 4,691,152 | 9/1987 | Ell et al. | 318/616 |
| 4,714,866 | 12/1987 | Sterner et al. | 318/636 |
| 4,725,959 | 2/1988 | Nagata | 364/474 |
| 4,816,734 | 3/1989 | Kurakake et al. | 318/615 |
| 4,851,754 | 7/1989 | Sakamoto et al. | 318/616 |
| 4,904,915 | 2/1990 | Kurakake | 318/568.22 |

*Primary Examiner*—William M. Shoop, Jr.
*Assistant Examiner*—Karen Masih
*Attorney, Agent, or Firm*—Antonelli, Terry, Stout & Kraus

[57] ABSTRACT

In a servo system using a discrete signal relative to a position, a time delay and an error upon detecting a speed due to lack of positional information are eliminated to achieve a positioning to a target position in a short time. A pulse signal $X_P$ relative to a position is used to establish synchronization with an observer which is adjusted to match with an actual apparatus comprising a load, a motor and so on, and an estimated speed value or an estimated position value generated by the observer are used to determine an operating signal for the servo system.

32 Claims, 21 Drawing Sheets

F I G. 15
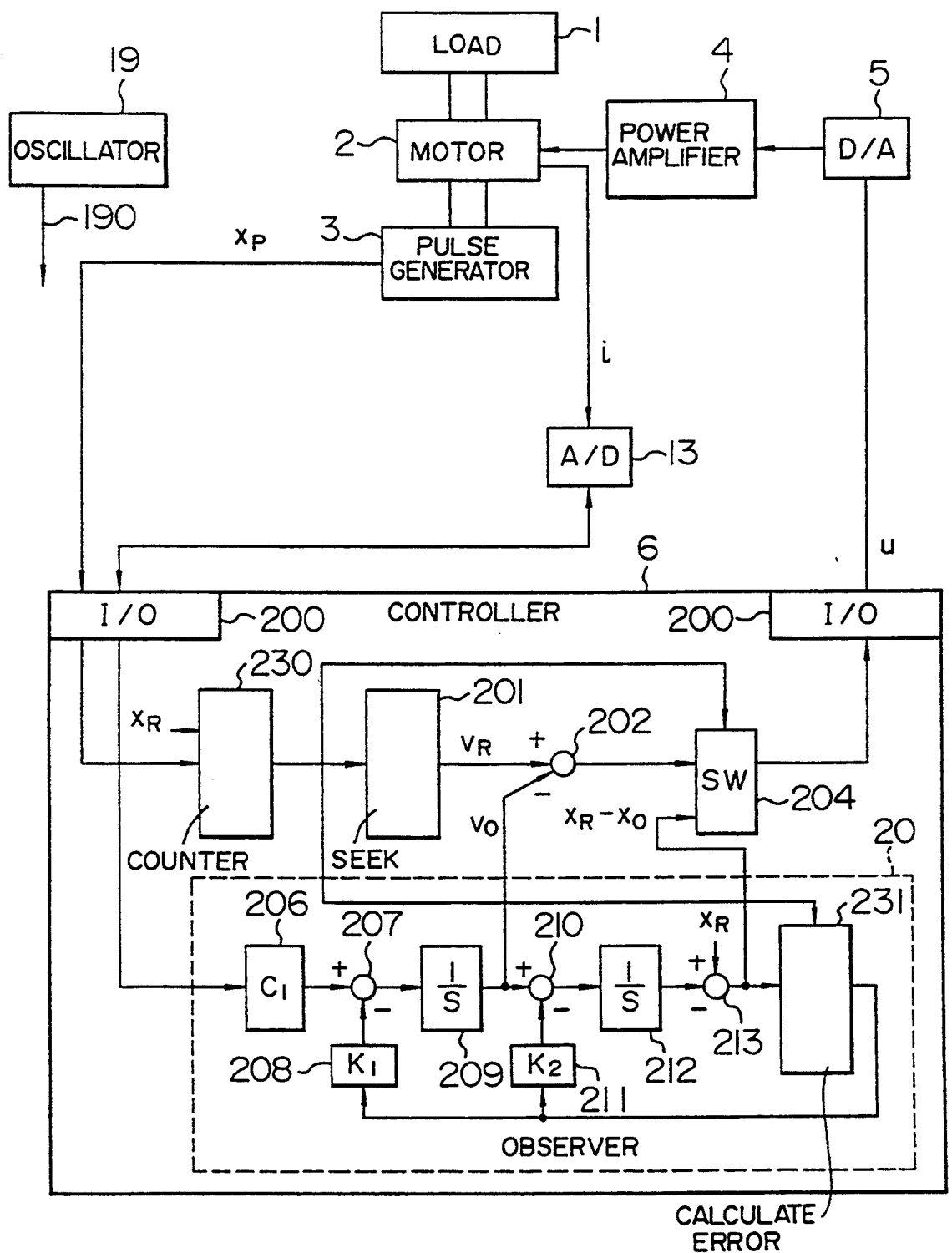

SERVO CONTROL METHOD FOR A SERVO SYSTEM

BACKGROUND OF THE INVENTION

The present invention relates to a servo system using a position detector for converting an analog amount such as a physical amount and an angular position of a shaft to a digital amount, for example, a pulse generator like an encoder. Particularly, the servo system according to present invention is suitable for use in business machines, household electric appliances, information machines, working machines, measurement machines, industrial robots and so on, in addition to being suitable for use in a magnetic disk drive unit, an optical disk drive unit, a magnetic tape drive unit and so on, the position and speed of which are digitally controlled by a digital computer.

An apparatus described in JP-A-63-92283 is provided with an electronic circuit having characteristics of a speed detector and a motor which are approximated by a first-order low pass filter. This electronic circuit is constructed so as to serve as an observer for the motor, where a speed signal without phase delay is extracted from the observer to form a speed feedback signal and a phase feedback signal for controlling the speed of the motor. Also, JP-A-63-271728 discloses that an observer is constituted within a controller for interpolating a discontinuous position signal outputted from a position detector for converting an analog amount such as a physical amount and an angular position of a shaft to a digital amount, and an estimated signal generated by the observer is used for a positioning control.

The speed detector disclosed in the above-mentioned official gazette detects an approximate speed, not an instantaneous speed, so that a detection error and a delay are increased particularly in a low speed range, which results in degrading the estimation accuracy of the observer.

Also, when an estimated value generated by the observer includes an error, the foregoing prior art does not consider synchronously extracting an actually detected value and the estimated value in an adjusting process of the observer for reducing the error in the estimated value. Specifically, as a result of extracting a discrete detected value (the same meaning as quantization) and a continuous estimated value and comparing them with each other without considering time synchronization of both, a false speed deviation (error) is generated, and the adjustment of the observer becomes insufficient and unstable, whereby a highly accurate condition estimation by the observer is not expected, and accordingly the control of the servo system is insufficient.

SUMMARY OF THE INVENTION

It is an object of the present invention to provide a servo control method for a servo system using a pulse generator such as an encoder for converting an analog amount such as a physical amount and an angular position of a shaft to a digital amount which is capable of performing a stable and highly accurate speed control even if the servo system is operated with changes in speed such as acceleration and deceleration.

It is another object of the present invention to provide a servo control method for a servo system using a pulse generator such as an encoder for converting an analog amount such as a physical amount and an angular position of a shaft to a digital amount, which is capable of performing a stable and fast positional control.

It is a further object of the present invention to provide a servo control method for a servo system using a pulse generator such as an encoder for converting an analog amount such as a physical amount and an angular position of a shaft to a digital amount, which is capable of performing stable speed and position controls without a steady-state deviation occurring even if a durable external disturbance such as a friction force exists.

The method according to the present invention controls a motor so as to reduce the difference between a target value of a speed or position and an estimated value generated by an observer as well as to adjust the observer in accordance with the difference between a detected value discretely generated by converting an analog amount such as a physical amount and an angular position of a shaft to a digital amount and the estimated value of the observer, where the used estimated value is synchronized with a time at which the detected value is obtained.

The servo control method for controlling a position, speed angle or the like of a load device using an estimated value generated by an observer is characterized in that the estimated value of the observer is held at a timing of a pulse signal at which a detection is performed, and the observer is adjusted on the basis of the difference between the held estimated value and a detected value when the estimated value is held.

To achieve the above objects, it is a key point that an observer for estimating a speed, position or the like of a servo system is constituted in a controller generally implemented by an electronic circuit, and the observer is correctly adjusted in conformity to an actual apparatus or an apparatus subjected to servo control. The actual servo system operates with a timing completely assynchronous with the observer constituted in the controller. A correct adjustment of the observer cannot be achieved by a conventional observer adjusting method which simply compares signals without considering the timing. The present invention synchronizes the operation of the actual servo system with a flow of signals in the observer constituted in the controller to adjust the observer at the same timing, thereby making it possible to derive a correct estimated value.

BRIEF DESCRIPTION OF THE DRAWINGS

FIG. 15 is a block diagram illustrating the configuration of a servo system embodying a servo control method according to the present invention;

DESCRIPTION OF THE PREFERRED EMBODIMENTS

Figure 1:
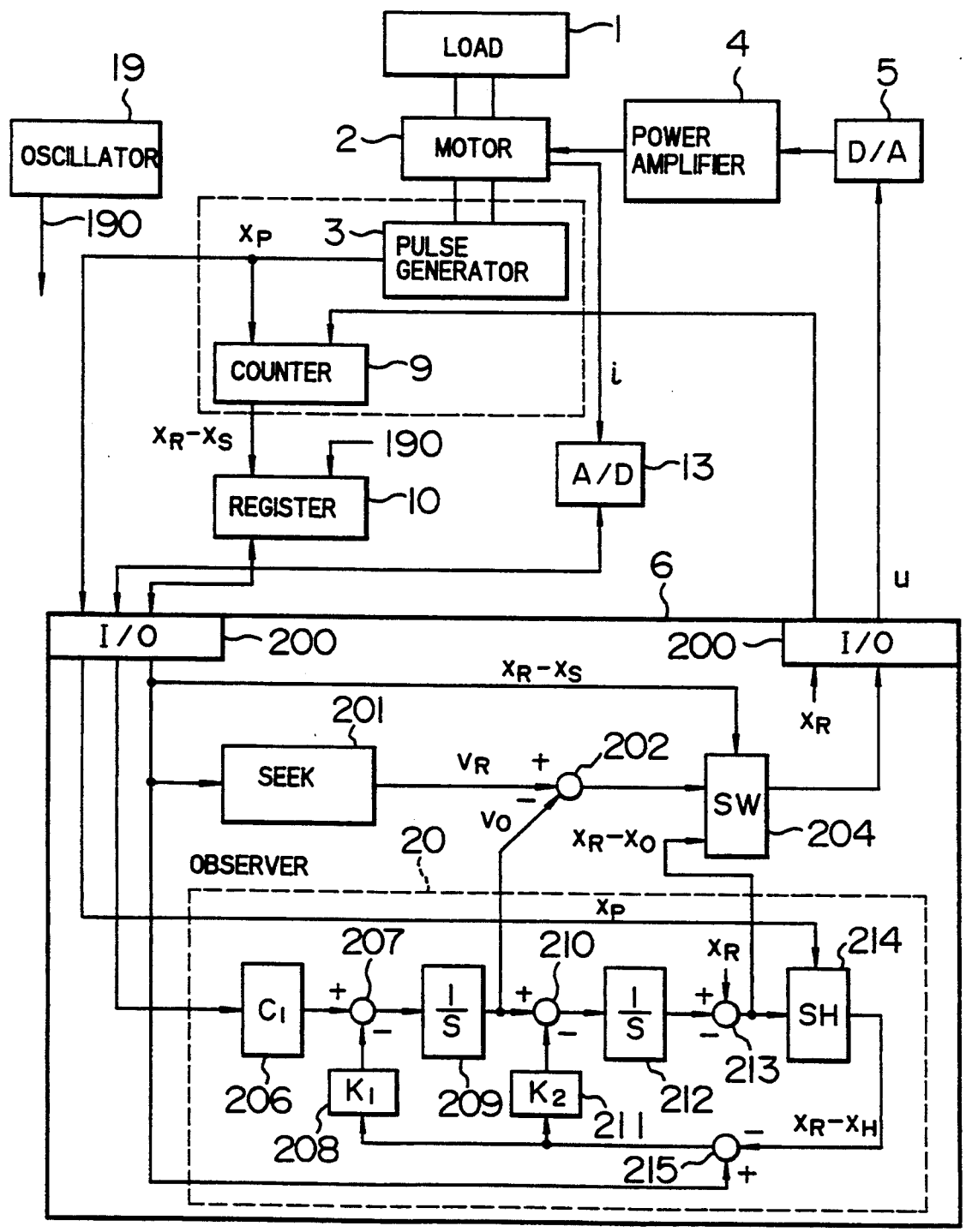
FIG. 1 is a block diagram illustrating a servo system embodying a servo control method according to the present invention.

The present invention will hereinbelow be described in detail on the basis of embodiments. FIG. 1 is a block diagram illustrating the configuration of an embodiment of a servo system in which a method of the present invention is implemented. A load 1 may be a rotary type load or a linear type load. A motor 2 for driving the load 1 may be a rotary type or a linear type such as a voice coil type motor. A pulse generator 3 for detecting a movement of the load 1 or the motor 2, which converts a position in an analog amount to a digital signal, may be a rotary type such as a rotary encoder or a linear type.

A controller 6 is constituted by an electronic circuit. In the present embodiment, the controller 6 comprises a digital computer having a processing unit, a memory, an oscillator and an I/O function. Each processing within the controller 6 is shown in block form for easier understanding.

An operating signal u processed in the controller 6 to be supplied to the motor 2 is outputted from an I/O port 200 to a D/A converter 5 and further outputted from the D/A converter 5 through a power amplifier 4 to the motor 2. A motor current i is delivered through an A/D converter 13 to the I/O port 200 of the controller 6. A pulse generator 3 generates a discrete pulse signal $X_P$ in response to a positional movement of the load 1 or the motor 2 which is delivered to the I/O port 200 as an external trigger signal to the controller 6 as well as to a counter 9.

A position detector is formed of the pulse generator 3 and the counter 9. The counter 9 is of an up/down type for counting the pulse signal $X_P$. This position detector is provided for detecting a positional deviation $(X_R - X_S)$ from a current position $X_S$ to a target position $X_R$, where the target position $X_R$ is preset in the counter 9 from the controller 6 through the I/O port 200. When the pulse signal $X_P$ is generated, a detected value of the positional deviation $(X_R - X_S)$ is determined in the counter 9. This is outputted to a register 10 and stored therein in synchronism with the generation of a clock signal 190 from an oscillator 19. Incidentally, although in this embodiment the counter 9 detects the positional deviation, the counter 9 may of course detect the position itself. The same goes for other embodiments later described.

Next, description will be made as to a sequence of processings within the controller 6 for determining the operating signal u. This sequence of processings is executed once per sampling period of the controller 6. First, the positional deviation $(X_R - X_S)$ stored in the register 10 is read therefrom through the I/O port 200. When the read $(X_R - X_S)$ is larger than a predetermined value $X_L$, the operating signal u is determined by executing seek processings at 201, 202 for having the load 1 reach the target position in a shorter time. The seek processing at 201 determines a speed instruction value $V_R$ for having the load 1 reach the target position in a shorter time. The speed instruction value $V_R$ has been previously stored in a memory, (not shown) as a function of the positional deviation $(X_R - X_S)$ such that $V_R$ is read by inputting $(X_R - X_S)$ to the memory. The seek processing at 202 compares the speed instruction value $V_R$ with a speed $V_O$ estimated by a condition observer 20 to determine the operating signal u for eliminating the difference $(V_R - V_O)$ therebetween. The next processing at 204 executes a switching of the operating signal u based on the positional deviation $(X_R - X_S)$. Specifically, when the positional deviation $(X_R - X_S)$ is larger than the predetermined value Xc, the operating signal u determined by the seek processing at 202 is selected. As a result of the seek processings, if the positional deviation $(X_R - X_S)$ is reduced to be below the predetermined value Xc, a processing is executed for positioning the load 1 at the target position. In this event, a signal for reducing the positional deviation $(X_R - X_O)$ estimated by the observer 20 is newly added to the operating signal u determined by the seek processings.

Next, description will be made as to a sequence of processings for determining the estimated speed $V_O$ and the estimated positional deviation $(X_R - X_O)$ in the observer 20. In a manner similar to the processing for determining the operating signal u, the processings of the observer 20 are executed once per sample period. First, the motor current i stored in the A/D converter 13 is read through the I/O port 200. In the next processing at 206, an acceleration is estimated based on the read motor current. A constant $C_1$ is provided for converting the motor current i to an acceleration, and its value has been previously stored in the memory (not shown). The next processing at 207 adjusts the acceleration of the observer, which is executed when an error occurs between a detected value of an actual apparatus and an estimated value of the observer, for eliminating the error. An adjustment value is determined by a processing at 208. A constant $K_1$ has been previously stored in the memory (not shown). The next processing at 209 estimates a speed of the observer, where an integration is performed therefor. An initial value of the integration is reset to zero every time the target position $X_R$ is set. The next processing at 210 adjusts the speed of the observer, which is similar to the foregoing processing at 207 for adjusting an acceleration. However, an adjustment value in this event is determined by a processing at 211. A constant $K_2$ has been previously stored in the memory (not shown). The next processing at 212 calculates a position, i.e., an integration is performed therefor. An initial value of the integration is reset to zero every time the target position $X_R$ is set. The next processing at 213 determines an estimated value of the positional deviation $(X_R - X_O)$ of the observer. The next sample and hold processing at 214 samples and holds the positional deviation $(X_R - X_O)$ estimated by the observer 20 and determines a held value $(X_R - X_H)$. Note that a timing of the sample and hold processing is determined by the pulse signal $X_P$ generated by the pulse generator 3. Specifically, when the signal $X_P$ is inputted to the I/O port 200, the sample and hold processing at 214 is performed taking priority of all other processings within the controller 6.

Figure 2:
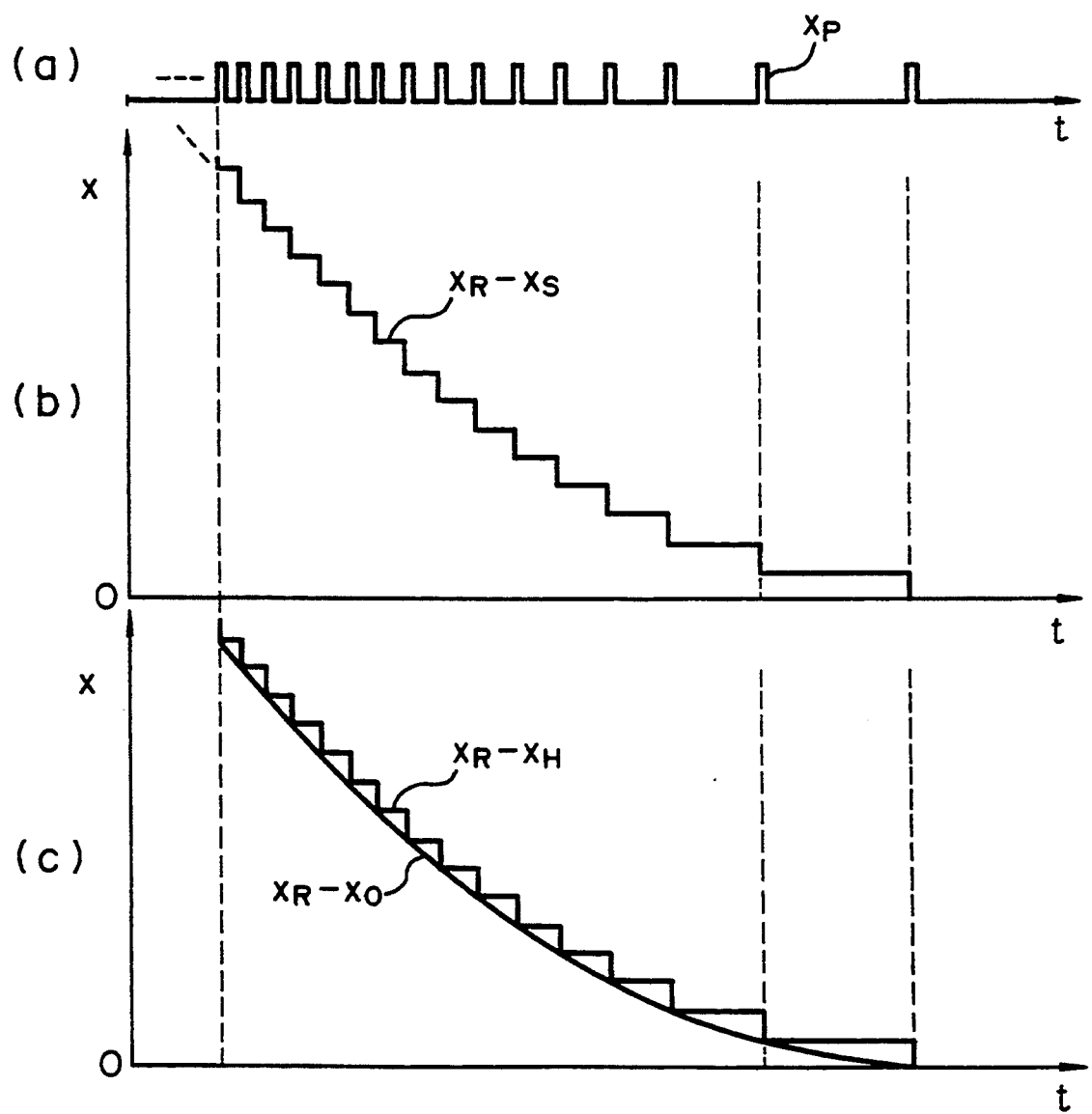
FIGS. 2 shows timing charts relative to position signals.

FIG. 2 shows timing charts relative to position signals. FIG. 2(a) shows the pulse signal $X_P$ from the pulse generator 3, (b) shows the positional deviation $(X_R - X_S)$ detected by the position detector, and (c) shows the positional deviation $(X_R - X_O)$ estimated by the observer 20 and its held value $(X_R - X_H)$. It can be seen from these timing charts that the positional deviations $(X_R - X_S)$ and $(X_R - X_H)$ are simultaneously generated in synchronism with a leading edge of the pulse signal $X_P$. The next processing at 215 compares the value $(X_R - X_S)$ detected by an actual apparatus with the held estimated value $(X_R - X_H)$ and detects an error therebetween. In FIG. 2, if the detected value $(X_R - X_S)$ is compared with the estimated value by the observer $(X_R - X_O)$, a saw-like noise may be generated depending on the comparison timing. However, in the comparison of $(X_R - X_S)$ with $(X_R - X_H)$, both signals are correctly synchronized with each other so that the above-mentioned noise will not be generated. The next processing at 208 determines an adjustment value for fitting a speed estimated by the observer 20 to the actual apparatus on the basis of the error resulting from the comparison of the detected value of the actual apparatus with the held estimated value of the observer 20. A processing at 211, in parallel with the processing at 208, determines an adjustment value for fitting a speed estimated by the observer 20 to the actual apparatus, similar to the processing at 208. In the present embodiment, every time the pulse signal $X_P$ is generated, a trigger signal is generated to the controller 6 from the outside to sample and hold the positional deviation $(X_R - X_O)$ estimated by the observer 20. The detected value $(X_R - X_S)$ in turn is determined in synchronism with the generation of the pulse signal $X_P$. As a result, the estimated and detected positional deviations $(X_R - X_H)$ and $(X_R - X_S)$ are generated substantially at the same time, thereby correctly adjusting the observer 20 without generating a saw-like error signal.

Although the present embodiment describes an example where the positional deviation $(X_R - X_O)$ estimated by the observer 20 is sampled and held in synchronism with the generation of the pulse signal $X_P$, if the sample and hold processing may be executed after the processings at 208, 211 and 215 have been completed, similar effects can be produced. For example, if the sample and hold processing is executed after the processing at 215, a saw-like noise is generated in the processing at 215 as a result of comparing the positional deviation $(X_R - X_O)$ estimated by the observer 20 with the detected value $(X_R - X_S)$. However, if a sample and hold processing is subsequently executed in synchronism with the generation of the pulse signal $X_P$, an error produced upon generating the pulse signal $X_P$ only is extracted and held, whereby the saw-like noise is consequently removed after the sample and hold processing.

Figure 3:
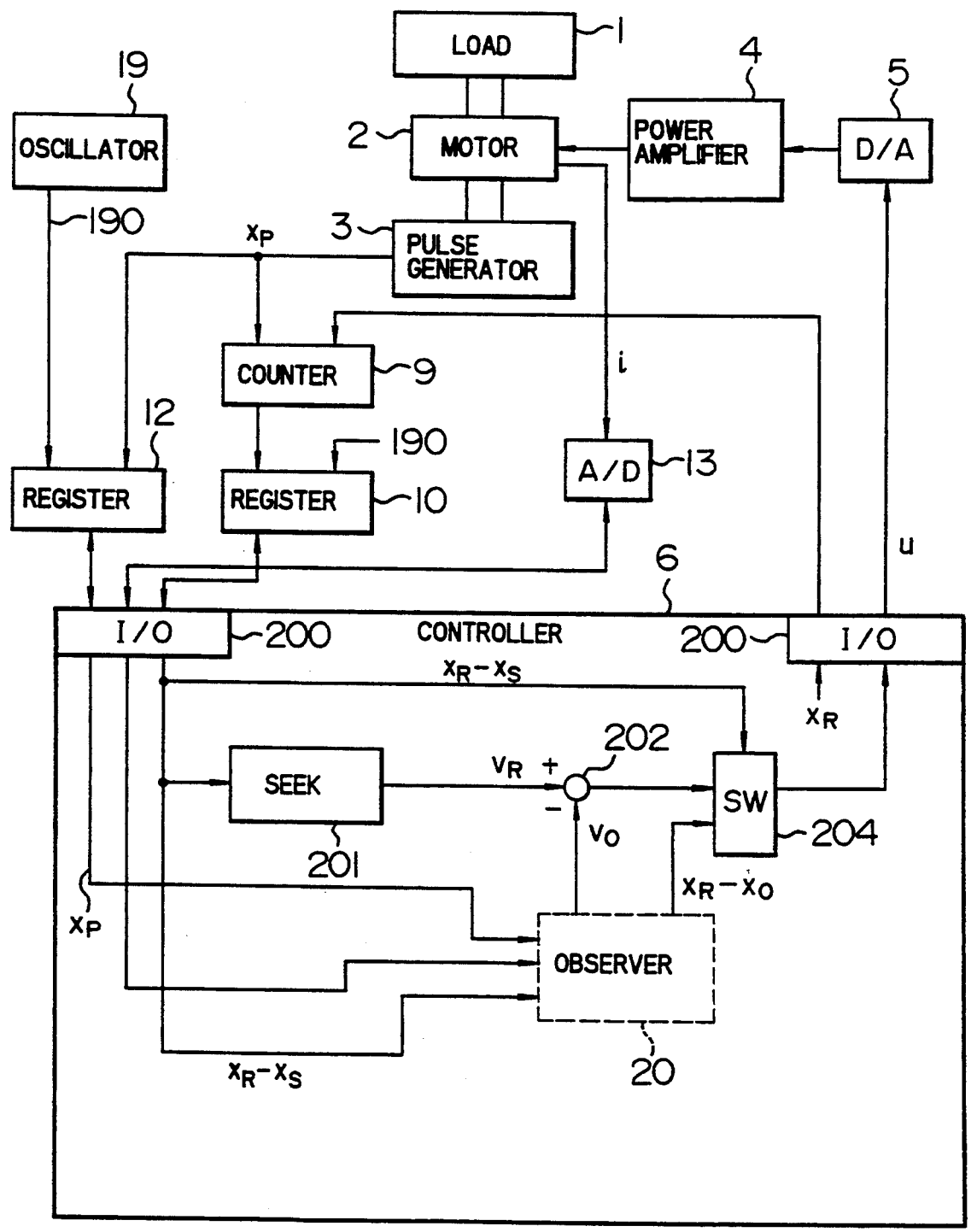
FIG. 3 is a block diagram illustrating the configuration of a servo system embodying a servo control method according to the present invention.

FIG. 3 is a block diagram illustrating the configuration of another embodiment of the present invention. This embodiment differs from the embodiment shown in FIG. 1 in that the former comprises a newly added register 12, while the rest of the configuration is the same in both embodiments. A pulse signal $X_P$ generated from a pulse generator 3 is delivered to the register 12 and stored therein in synchronism with a clock signal 190 generated by an oscillator 19. In this event, a register 10 for storing a detected value $(X_R - X_S)$ of an actual apparatus is allowed to store the detected value $(X_R - X_S)$ at the same timing at which the pulse signal $X_P$ is stored in the register 12 by using the same clock signal 190 from the oscillator 19. A controller 6 performs processings relative to an observer 20 and a processing for determining an operating signal u once per sample period. First, the pulse signal $X_P$ and the detected value $(X_R - X_S)$ are read through an I/O port 200. A sample and hold processing at 214 is executed when the pulse signal $X_P$ is ON and not when it is OFF. In other words, the pulse signal $X_P$ is used as a flag signal for establishing synchronization between an estimated value $(X_R - X_O)$ of the observer 20 and the detected value $(X_R - X_S)$. This configuration can produce equivalent effects to the embodiment shown in FIG. 1 without interrupt processing.

Figure 4:
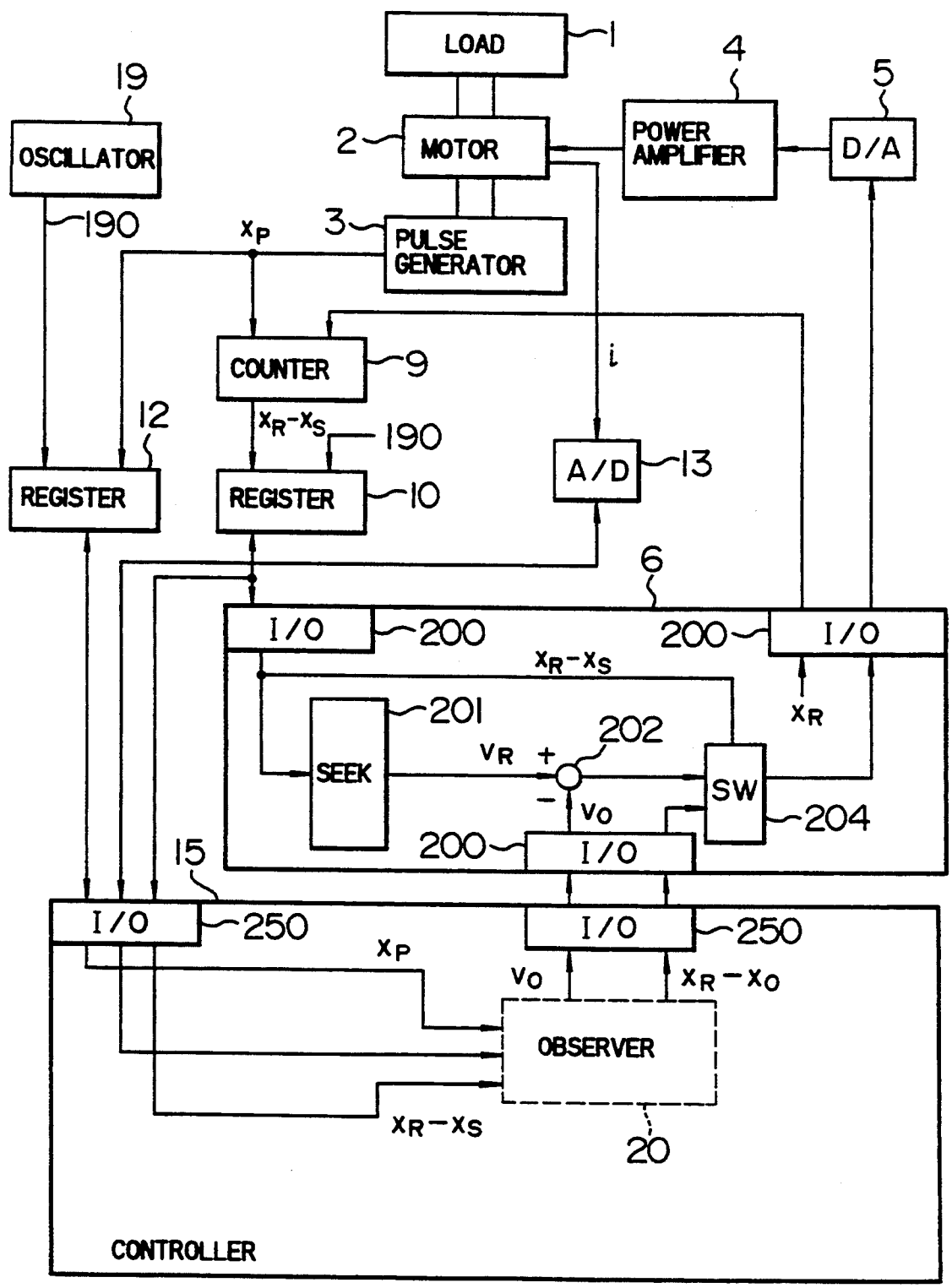
FIG. 4 is a block diagram illustrating the configuration of a servo system embodying a servo control method according to the present invention.

FIG. 4 is a block diagram illustrating the configuration of another embodiment of the present invention. This embodiment differs from the embodiments shown in FIGS. 1 and 3 in that an observer is exclusively constituted within a special controller 15. The controller 15 may be formed of a digital computer having a processing unit, a memory, an oscillator and an I/O function therein, similarly to the controller 6. An output of a register 10 is delivered to I/O ports 200, 250 of the respective controllers 6, 15. Outputs of a register 12 and an A/D converter 13 are in turn delivered to the I/O port 250 of the controller 15. An estimated speed value $V_O$ and an estimated positional deviation value $(X_R - X_O)$ both determined by the observer 20 within the controller 15 are delivered through the I/O port 250 to the I/O port 200 of the controller 6 for use in a sequence of processings for determining an operating signal. Here, a sequence of processings executed by the observer 20 and the sequence of processings for determining the operating signal are the same as those of the embodiments of FIGS. 1 and 3. In the present embodiment, since the observer 20 is constituted in the special controller 15, a sampling period thereof can be set independently of the controller 6. Consequently, a shorter or longer sampling period can be set, which results in enabling fast processings of the observer and accordingly fast estimations of speed and position.

Figure 5:
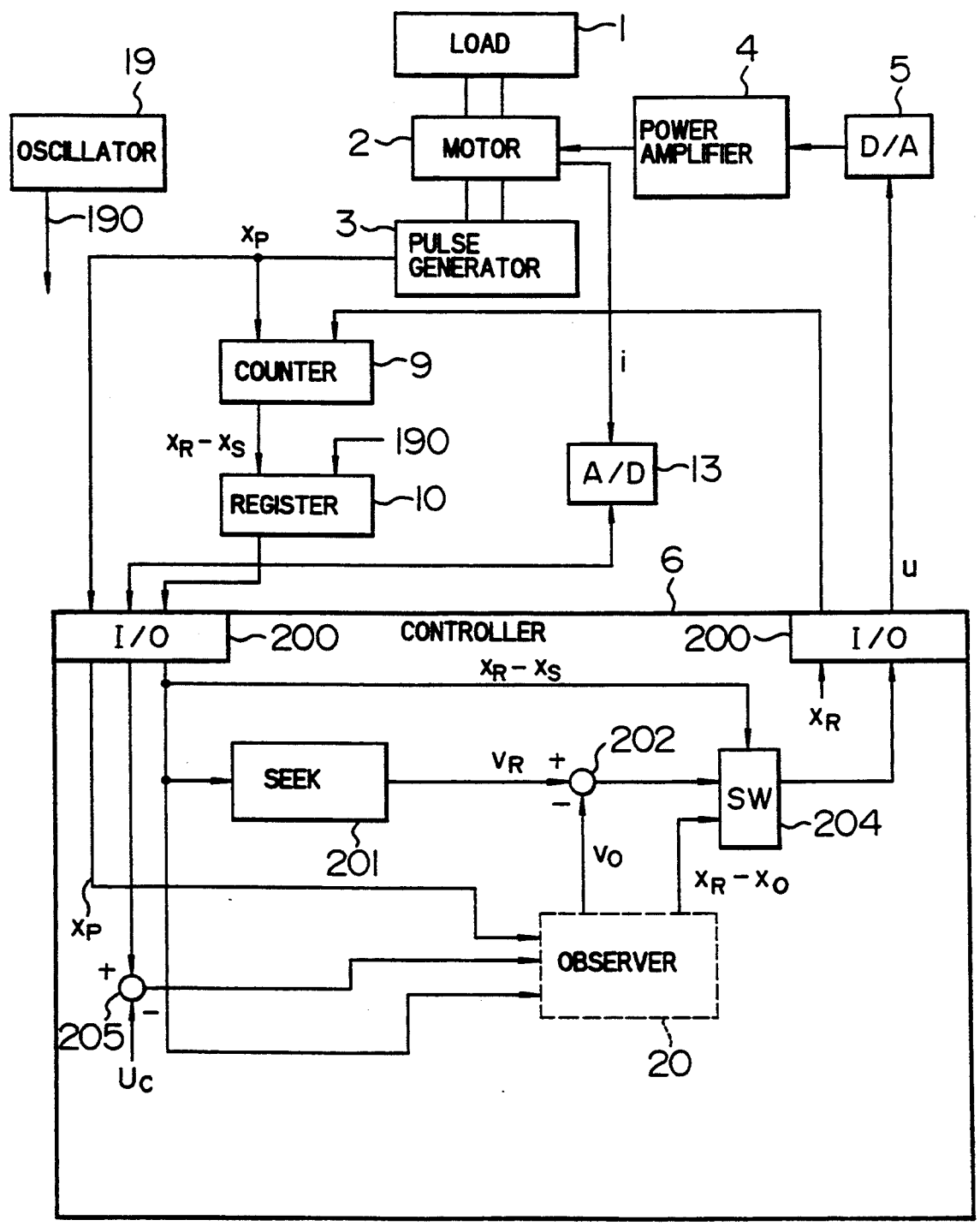
FIG. 5 is a block diagram illustrating the configuration of a servo system embodying a servo control method according to the present invention.

FIG. 5 is a block diagram illustrating the configuration of another embodiment of the present invention. This embodiment differs from the embodiment of FIG.

1 in that a processing at 205 is added to the processings executed by the observer 20 within the controller 6, and the rest of the configuration is the same. The processing at 205 adds a feedback signal Uc for canceling influences of external forces such as a friction force acting on a load 1 or a motor 2. This feedback signal Uc is generated by integrating an error resulting from a comparison of a detected value of an actual apparatus with a held estimated value of the observer. The present embodiment produces an effect of correcting an error which may occur in the observer due to influences of external forces such as a friction force acting on the actual apparatus.

Figure 6:
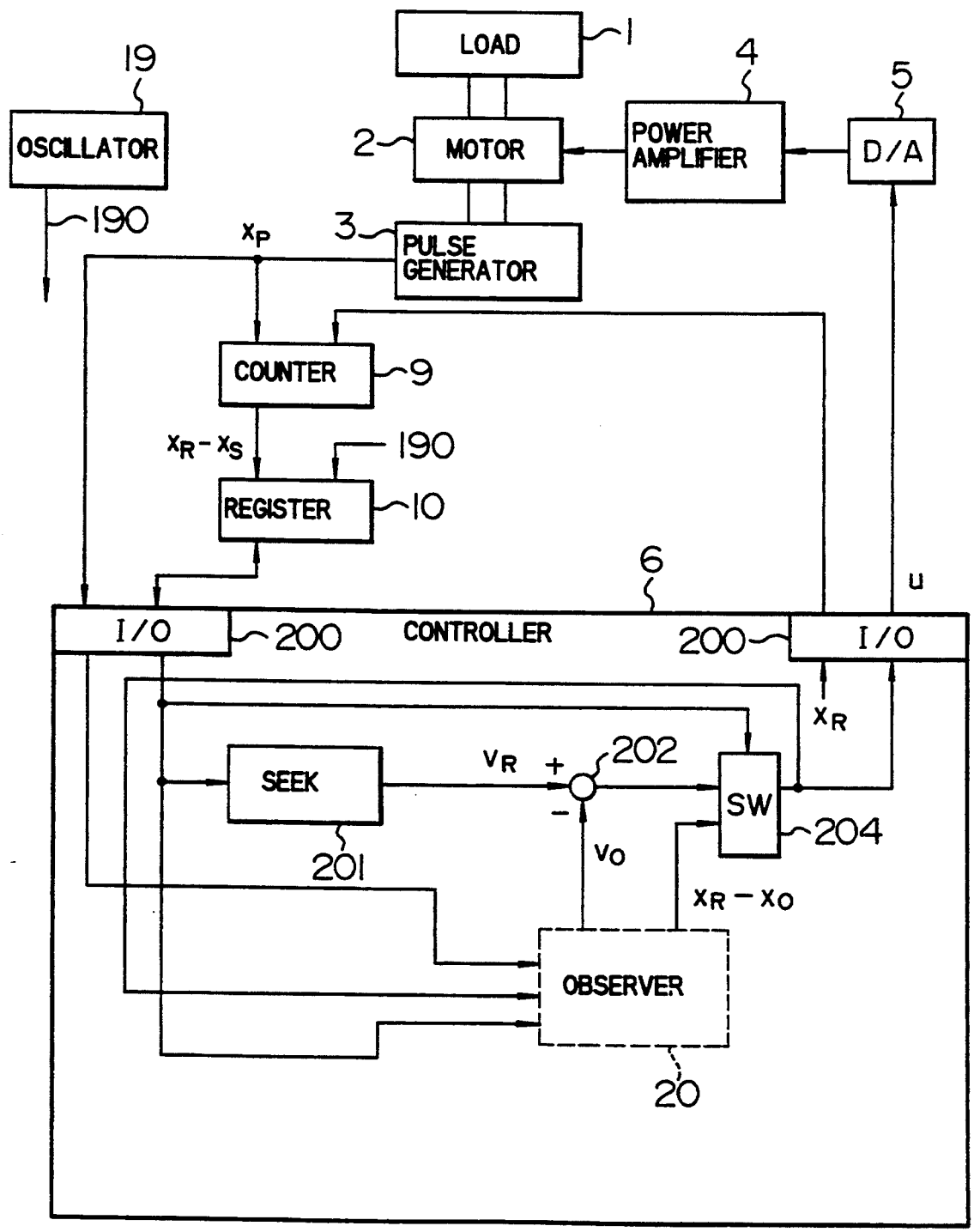
FIG. 6 is a block diagram illustrating the configuration of a servo system embodying a servo control method according to the present invention.

FIG. 6 is a block diagram illustrating the configuration of another embodiment of the present invention. This embodiment differs from the embodiment of FIG. 1 in that the A/D converter 13 is removed, and the operating signal u determined by the controller 6 is used in place of the motor current (a signal after A/D conversion) inputted to the controller 6, and the rest of the configuration is the same. In the present embodiment, an operating signal u is used in place of a motor current in processings executed by an observer 20. Thus, the present embodiment can remove the influence of brush noise or the like included in the motor current and thereby stabilize a servo system.

Figure 7:
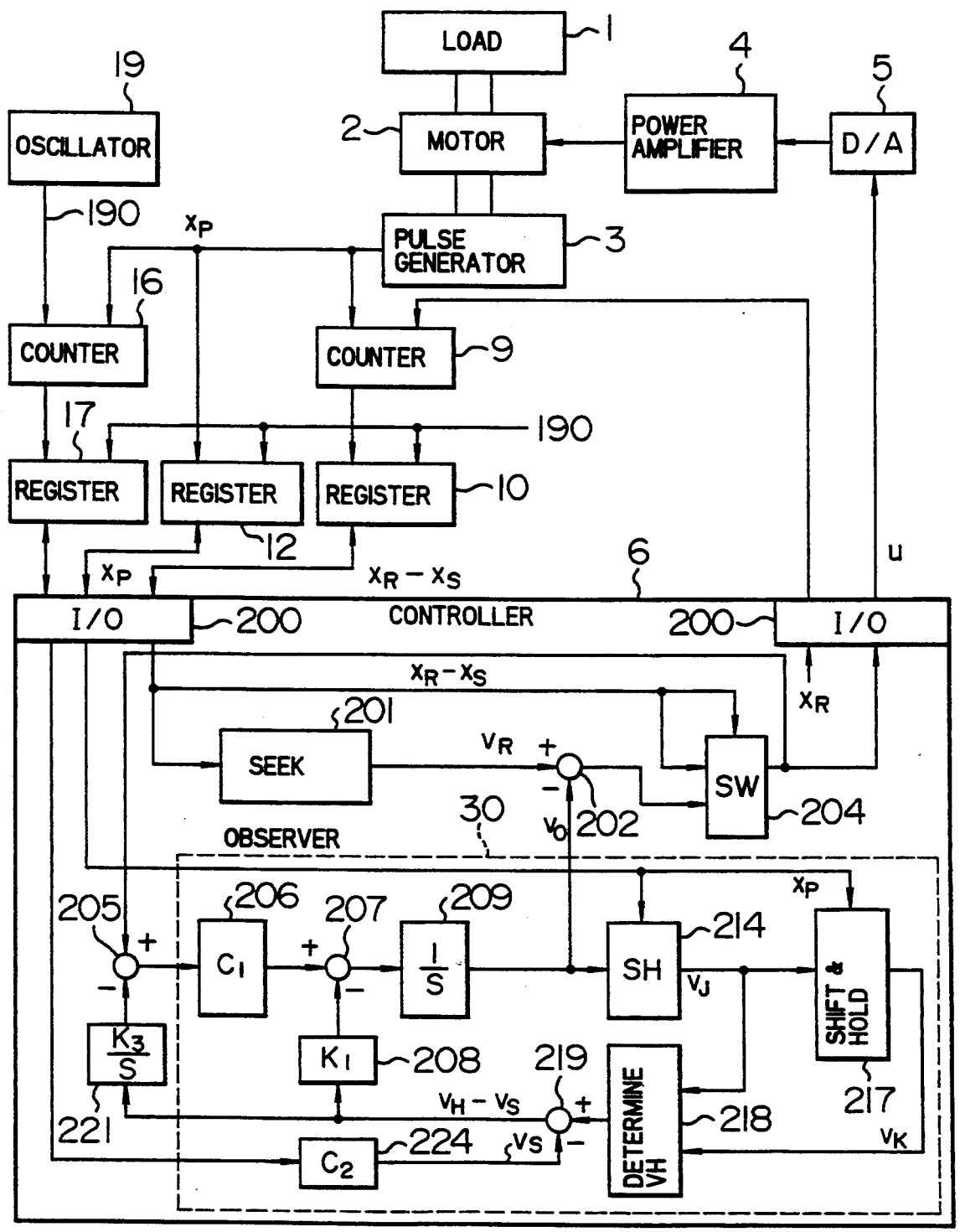
FIG. 7 is a block diagram illustrating the configuration of a servo system embodying a servo control method according to the present invention.

FIG. 7 is a block diagram illustrating the configuration of a further embodiment of the present invention. This embodiment differs from the embodiment of FIG. 1 in that a counter 16, a register 17 and a register 12 are added and the A/D converter 13 is removed. A further difference between the two embodiments lies in that a sequence of processings relative to the observer 20 within the controller 6 of FIG. 1 is constituted by another type of observer 30. The rest of the configuration of this embodiment is the same as that of the embodiment of FIG. 1. The present embodiment is newly provided with a pulse period detector which is composed of a pulse generator 3, counter 16 and an oscillator 19. The counter 16 measures the pulse period of a pulse signal $X_P$ generated from the pulse generator 3 using a clock signal 190 from the oscillator 19. In this event, the pulse signal $X_P$ is used to set and reset the counter 16. An output of the pulse period detector (output of the counter 16) is delivered to the register 17 and stored therein in synchronism with the generation of the clock signal 190 which is also supplied to the register 12. At this time, the register 10 stores a positional deviation $(X_R - X_S)$ from a current position to a target position, while the register 12 stores the pulse signal $X_P$. By using the one and same clock signal 190 from the oscillator 19, the respective registers 10, 12 and 17 store the positional deviation $(X_R - X_S)$, the pulse signal $X_P$, and the pulse period of the pulse signal $X_P$, respectively, at the same timing.

The controller 6 performs processings relative to the observer 30 and a processing for determining the operating signal u once per sampling period. First, the pulse signal $X_P$, the positional deviation $(X_R - X_S)$ and the pulse period of $X_P$ are read through an I/O port 200. A sequence of processings for determining the operating signal is the same as that of the embodiment shown in FIG. 1, whereas the following processing for positioning the load 1 at a target position employs the detected value $(X_R - X_S)$ in place of the estimated value $(X_R - X_O)$.

Next, description will be made as to a sequence of processings executed by the observer 30 for determining an estimated speed $V_O$. At first, the processing at 205 is carried out to adjust the input of the observer. In this embodiment, an adjustment value determined by a processing at 221 is subtracted from the operating signal u. A constant $K_3$ has been previously stored in a memory. The next processing at 206 estimates an acceleration. A coefficient $C_1$ is provided for converting the operating signal u to an acceleration, and its value has been previously stored in the memory. The next processing at 207 adjusts the acceleration with an adjustment value determined by a processing at 208. The next processing at 209 calculates the speed, where an integration is performed therefor. An initial value of the integration is reset to zero every time a target position $X_R$ is set. The next sample and hold processing at 214 samples and holds the speed $V_O$ estimated by the observer 30 and extracts a held speed value $V_J$ therefrom. It should be noted that this processing is executed only when the pulse signal $X_P$ read through the I/O port 200 changes from OFF to ON. An initial value of the held speed value $V_J$ is set to zero. The next processing at 217 shifts the value $V_J$ extracted by the sample and hold processing at 214 to another register (not shown) and holds the same therein as a held value $V_K$. An initial value of a held speed value $V_K$ is set to zero. The processing at 217 is also executed only when the pulse signal $X_P$ changes from OFF to ON, similarly to the processing at 214. The consequently derived value $V_K$ is extracted at a timing of the pulse signal $X_P$ one pulse before the extraction of the held speed value $V_J$. The next processing at 218 calculates a mean value of the two held speed values $V_J$ and $V_K$ to determine a mean speed value $V_H$. The next processing at 224 converts the pulse period read through the I/O port 200 to a detected speed value $V_S$ by the following equation $$V_S = \frac{C_2}{T_d}, \quad C_2 = \frac{2\pi r}{N} \tag{1}$$

where
  N: the number of pulses generated during one rotation of the pulse generator 3;
  $T_d$: the pulse period; and
  r: the radius of the load 1.

A constant $C_2$ has been previously stored in a memory.

Figure 8:
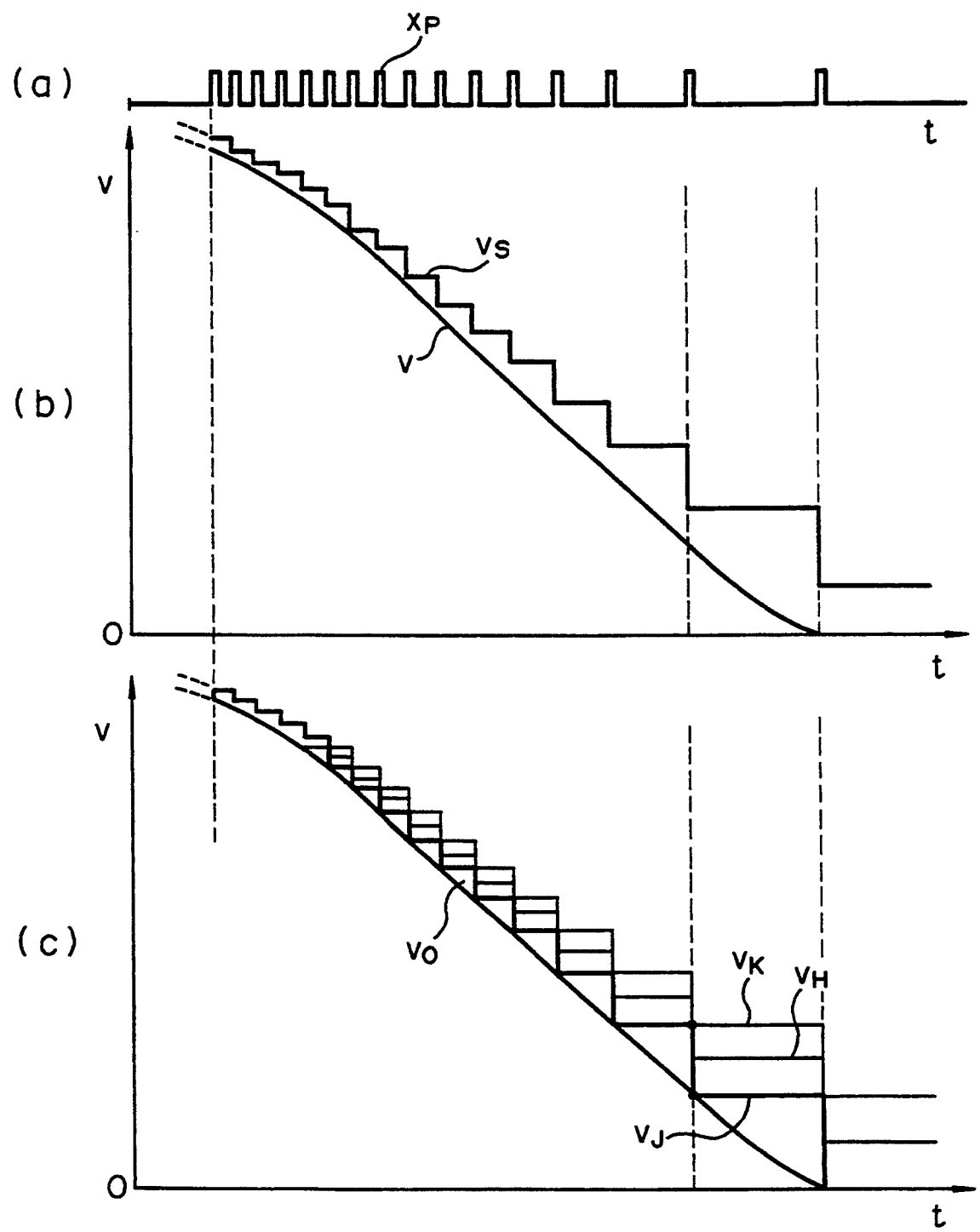
FIGS. 8 shows timing charts relative to speed signals.

FIG. 8 shows timing charts relative to the speed signals. In FIG. 8(a) shows the pulse signal $X_P$ generated by the pulse generator 3, (b) shows a detected speed value $V_S$ and an undetectable actual speed V, and (c) shows the speed value $V_O$ estimated by the observer 30 and its held values $V_J$, $V_K$ and $V_H$. The detected speed value $V_S$ in (b) does not represent the actual instantaneous speed V at a time of generating the pulse signal $X_P$ but a mean speed from a time the previous pulse signal $X_P$ was generated to a time the current pulse signal $X_P$ is generated, and the value $V_S$ is updated at the time the pulse signal $X_p$ is generated. As a result, the detected speed value $V_S$ is derived as a step-like signal including an absolute value error and a phase delay. In (c), the held value $V_J$ is an instantaneous value of the estimated speed $V_O$ derived in synchronism with a time at which a current pulse signal $X_P$ is generated. Likewise, the held value $V_K$ is an instantaneous value of the estimated speed $V_O$ derived in synchronism with a time at which the previous pulse signal $X_P$ is generated, while the held value $V_H$ corresponds to a mean value of the estimated speed $V_O$ from the time the previous pulse signal $X_P$ was generated to the time the. current pulse signal $X_P$ is generated.

The next processing at 219 compares the detected value $V_S$ of an actual apparatus with the held value $V_H$ estimated by the observer 30. In FIG. 8, a comparison of the detected value $V_S$ with the observer estimated value $V_O$ may result in generating a saw-like noise depending on a comparison timing. However, the comparison of the detected value $V_S$ with the held value $V_H$, since both signals are in a correctly synchronized state, will never generate such a noise. The next processing at 208 determines an adjustment value for fitting an acceleration derived by the observer 30 to the actual apparatus on the basis of the output of the processing at 219. In the next processing at 221, the integration operation is made to determine the adjustment value by which the effect of the external force acting on the actual apparatus is compensated. Although the present embodiment illustrates the configuration of determining the adjustment value using the output of the processing at 219 once per sample period, several adjustment values may be held to determine a definite adjustment value once per several sample periods. Also, the present embodiment shows the processing for positioning the load 1 at a target position using the positional deviation $(X_R - X_{XS})$ in the sequence of processings for determining the operating signal u. Alternatively, another configuration may also be employed where the observer estimated speed value $V_O$ is employed to perform an integration for estimating a position $X_O$, a processing for calculating a positional deviation $(X_R - X_O)$ is added, and this positional deviation $(X_R - X_O)$ is used in place of the detected value $(X_R - X_S)$.

Figure 9:
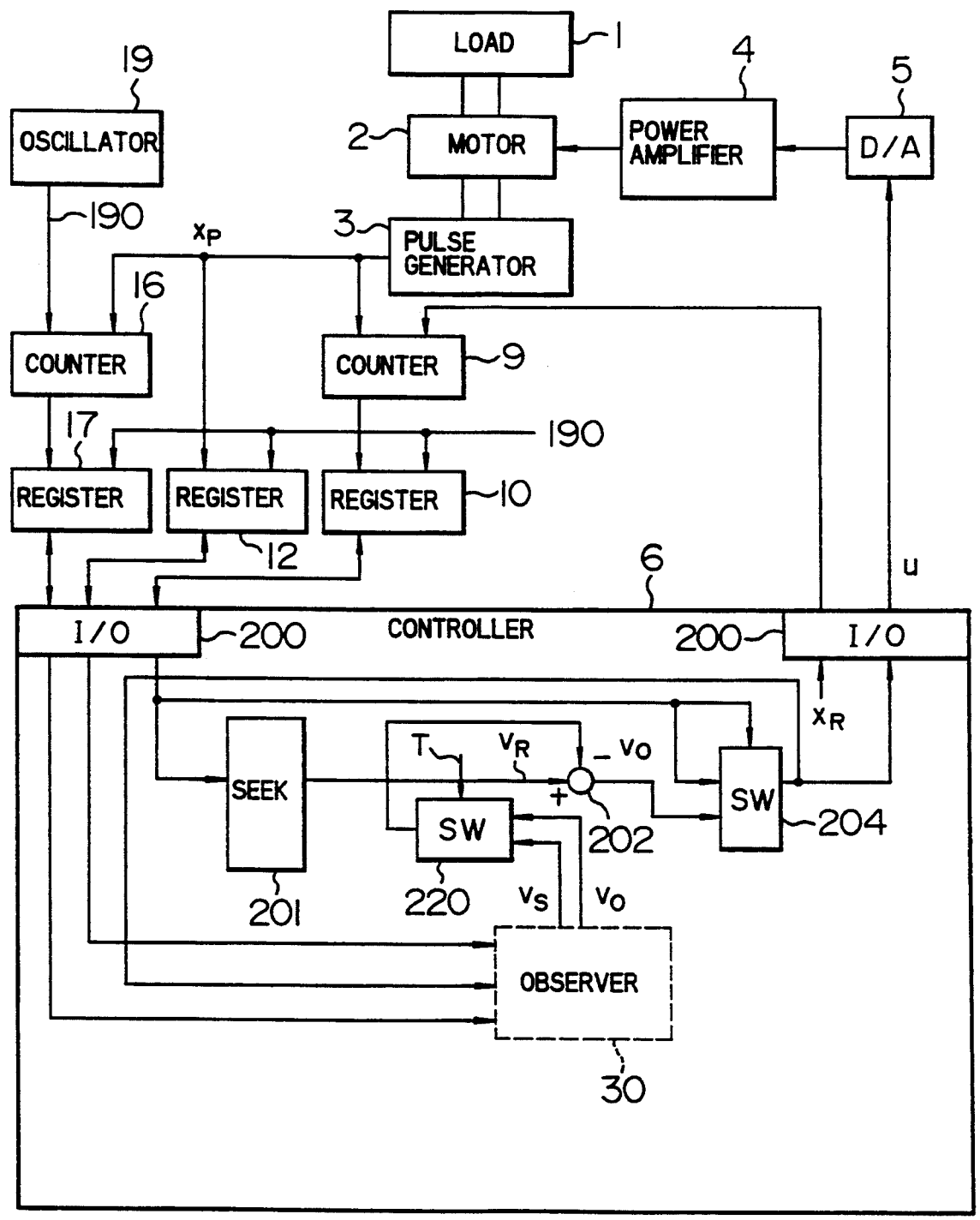
FIG. 9 is a block diagram illustrating the configuration of a servo system embodying a servo control method according to the present invention.
Figure 10:
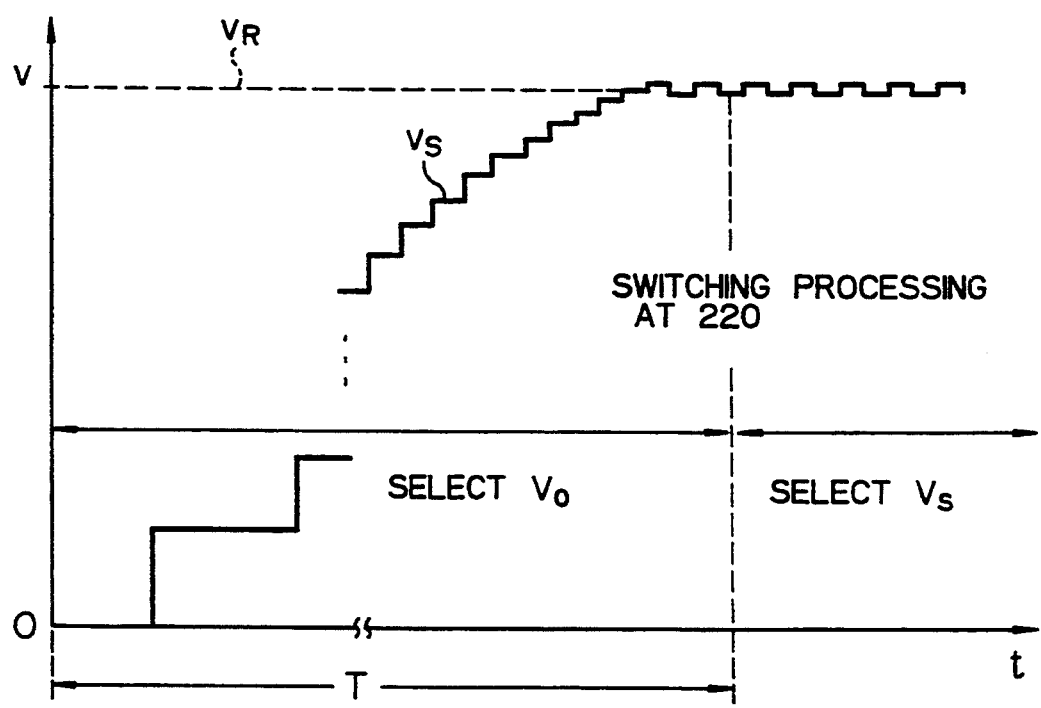
FIG. 10 is a chart illustrating a speed signal switching timing.

FIG. 9 is a block diagram illustrating the configuration of another embodiment of the present invention. This embodiment differs from the embodiment shown in FIG. 7 in that a processing for employing both of the observer estimated speed value $V_O$ and the detected speed value $V_S$ or switching them is added to the sequence of processings for determining the operating signal within the controller 6. The rest of the configuration is the same as the embodiment of FIG. 7. A switching processing at 220 switches between the detected speed value $V_S$ and the observer estimated speed value $V_O$ on the basis of a signal indicating an operating condition of a servo system, for example, the detected speed value $V_S$ or a time T elapsed after the initiation of the servo system. FIG. 10 is a chart illustrating an example of a switching timing of the speed signals. When an elapsed time T after the initiation is below a predetermined value, the observer estimated value $V_0$ is selected, while and when the elapsed time T exceeds the predetermined value, the detected speed value $V_S$ is selected. The selection may also be made based on the detected speed value $V_S$ such that the observer estimated speed value $V_O$ is selected when the detected speed value $V_S$ is below a predetermined value and the detected speed value $V_S$ is selected when it exceeds the predetermined value.

If the speed is switched using a weighted mean time as expressed by the following equation (2), the servo system can be prevented from malfunctioning due to the switching operation:

$$V_F = \frac{[t_n - t]V_0 + tV_S}{t_n} \quad (2)$$

where
t: an elapsed time after T ranging from 0 to $t_n$;
$t_n$: a switching time;
$V_O$: an estimated speed;
$V_S$: a detected speed.

Since the present embodiment limits a time period in which the observer estimated speed value $V_O$ is employed and accordingly increases a time period in which the detected speed value $V_S$, which has a higher reliability than the estimated speed value $V_O$, is employed, the reliability of the servo system is improved.

Figure 13:
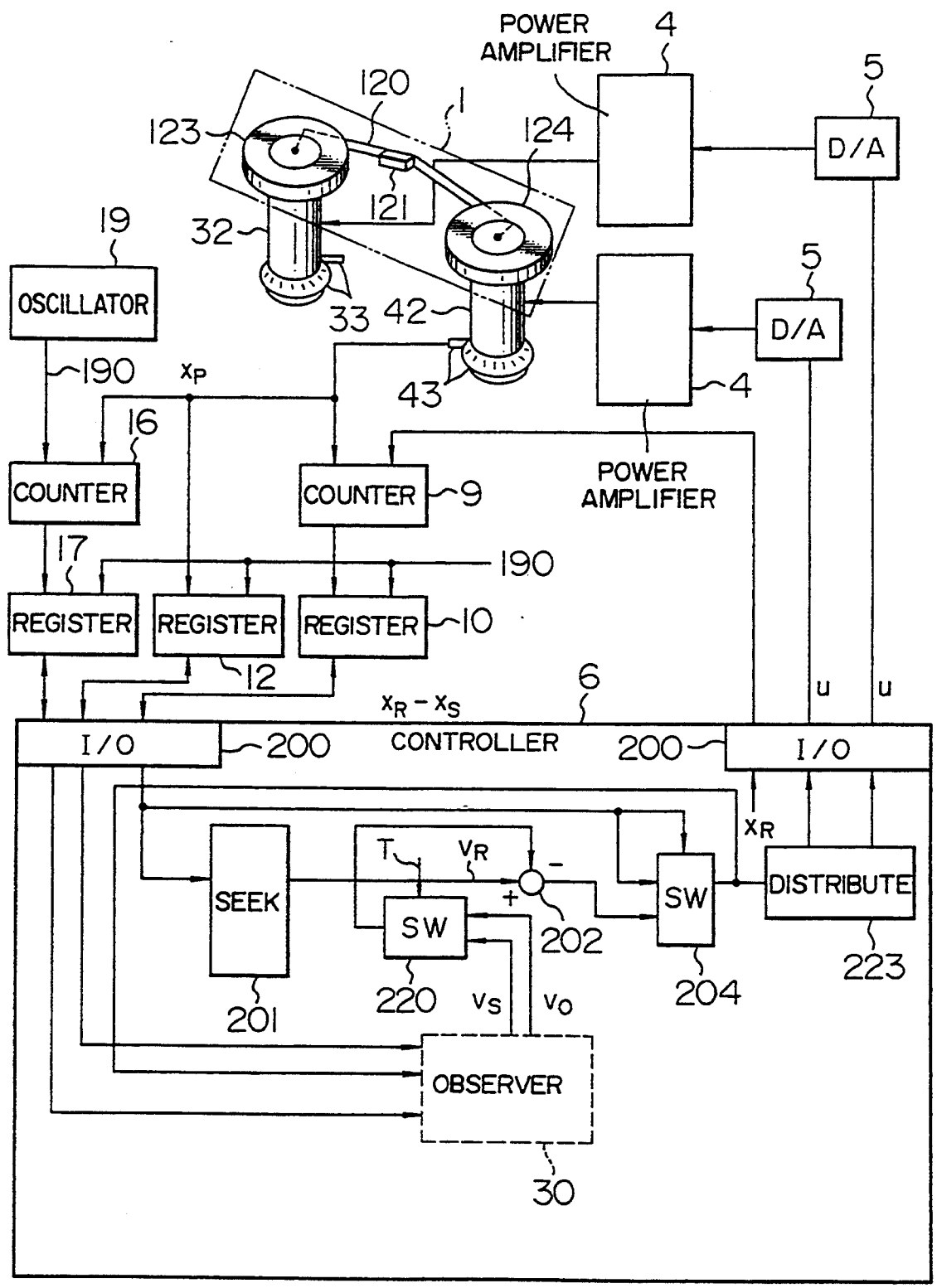
FIG. 13 is a block diagram illustrating the configuration of a servo system embodying a servo control method according to the present invention.

FIG. 13 illustrates an embodiment which employs a magnetic tape apparatus as the load 1 of FIG. 9. The load 1 comprises a magnetic head 121 for recording data on and reproducing data from a magnetic tape 120 wound around two reels 123, 124. The magnetic head 121 may be of a stationary head type or a rotary head type. Motors 32, 42 drive the two reels 123, 124 to transport the magnetic tape 120 wound around these reels in contact with the magnetic head 121 to record and reproduce data. A pulse generator 33,43 may be an encoder which generates a pulse signal $X_p$ every time the reel 123, 124 or the motor 32, 42 rotates by a predetermined angular distance for transporting the magnetic tape 120. The magnetic tape drive comprises two motors 32, 42 so that a processing at 223 is added for distributing the output derived by the processing at 204 within the controller 6 to the two motors 32, 42 as operating signals for driving them. The two motor operating signals derived by the processing at 223 are outputted through an I/O port 200 to two D/A converters 5. Outputs of the two D/A converters 5 are respectively amplified by power amplifiers 4 and outputted to the corresponding two motors 32, 42.

Figure 18:
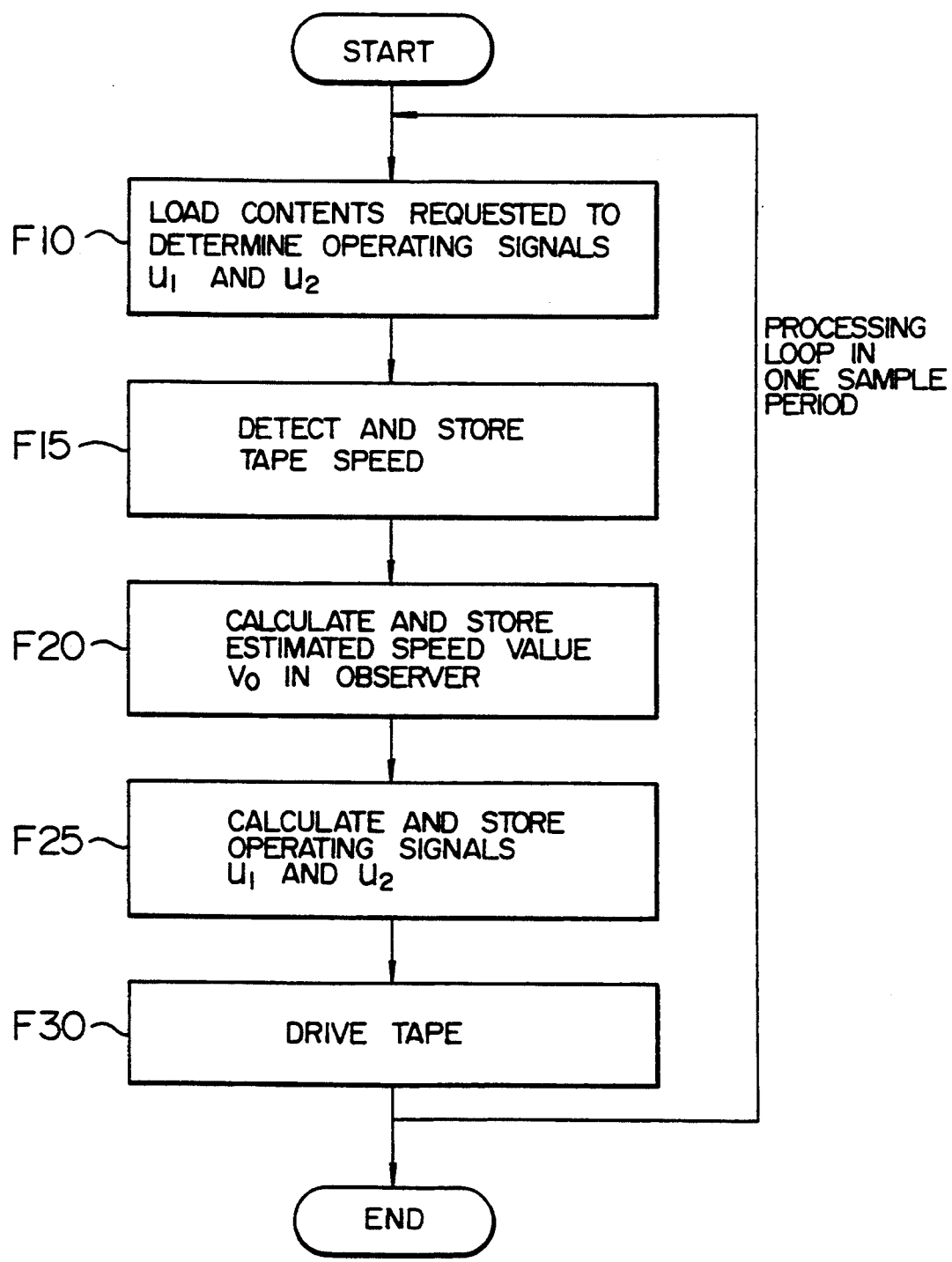
FIG. 18 is a flow chart illustrating the operation of a speed control for a magnetic tape drive.

Next, the operation of the apparatus shown in FIG. 13 will be described with reference to FIGS. 18 and 19. FIG. 18 is an operational flow chart illustrating the operation of the controller 6 in one sample period.

First, a processing at step F10 in FIG. 18 is executed. This is a processing for extracting constants required for determining operating signals $u_1$ and $u_2$ to the respective motors in the magnetic tape drive from a memory having such constants previously stored therein and loading the extracted constants.

The processing next proceeds to step F15 to detect a tape speed. A calculating algorithm for detecting a speed is given by the equation (1), where a pulse period $T_d$ is detected by a pulse period detector composed of the encoder 43, a counter 16 and the oscillator 19.

Next, at step F20, the observer 30 calculates and stores an estimated speed value $V_O$, the detailed operation of which will be later described with reference to an operational flow chart of FIG. 19.

Then, the flow proceeds to step F25 to calculate and store the operating signals $u_1$ and $u_2$ for the respective motors 32 and 42 required to stably transport a tape in accordance with a target value $V_R$. The operating signals $u_1$ and $u_2$ are calculated on the basis of the following equations (3):

$$u_1 = G_1 K_1 (V_R - V_0) + \frac{f_{r1}}{K_{T1}} \quad (3)$$

-continued $$u_2 = G_2 K_1 (V_R - V_0) + \frac{f_r r_2}{K_{T2}}$$

where

G₁, G₂: gain constants of the structures
K₁: a speed gain
$V_R$: a speed target value
$f_r$: a target tension value
r₁, r₂: radius of reels
$K_{T1}$, $K_{T2}$: a motor torque constant
$V_O$: an estimated speed value generated by the observer 30

Next, the flow proceeds to step F30, where the controller 6 outputs the operating signals u₁ and u₂ to the output port 200 for driving the motors 32 and 42.

The operation for calculating an estimated speed value $V_O$ in the observer 30 will be next described with reference to FIG. 19.

Figure 19:
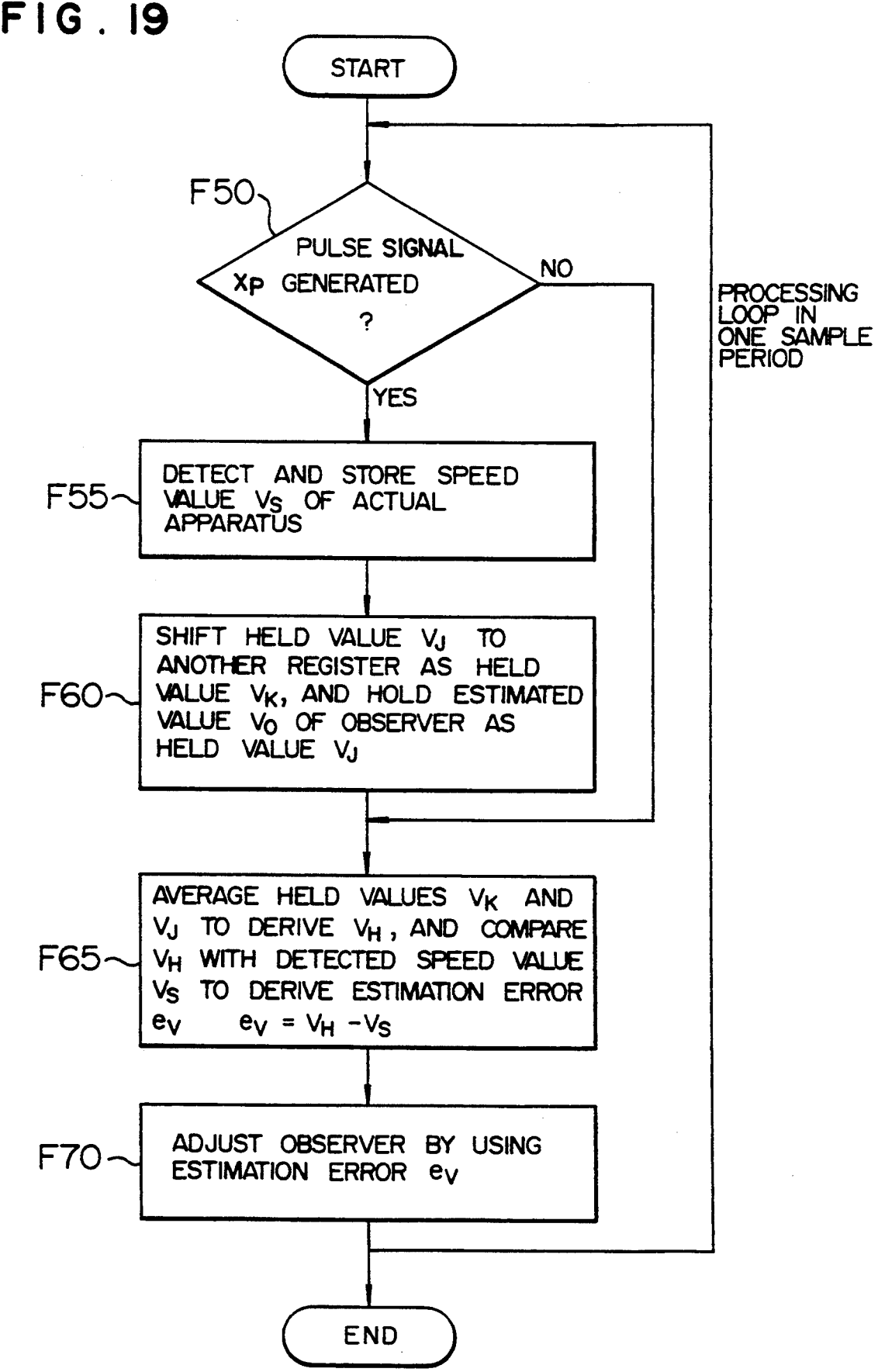
FIG. 19 is a flow chart illustrating a calculation of an estimated speed value.

First, a processing at step F50 in FIG. 19 is executed. Specifically, the controller 6 monitors, once per sample period, the generation of the pulse signal $X_P$ from the pulse encoder 42 performed together with the tape transport of the magnetic tape drive.

When the pulse signal $X_P$ is generated, processings at steps F55 and F60 are excessively performed only at this time, and subsequently processings at steps F65 and F70 are performed.

When the pulse signal $X_P$ is not generated, the processings at steps F55 and F60 are bypassed. Since one sample period in the controller 6 is two or three figures shorter than the generation period $T_d$ of the pulse signal $X_P$, the processing at step F50 produces an effect substantially equivalent to the interrupt by the pulse signal $X_P$ in the embodiment shown in FIG. 1. In other words, the processings at steps F55 and F60 are executed in synchronism with the generation of the pulse signal $X_P$.

A processing at the next step F55 is the same as the processing at step F15 as previously explained in connection with FIG. 18. This processing is present again in FIG. 19 as step F55 for clarifying the processing timing.

Next, at step F60, a synchronous sampling and holding processing, which constitutes a feature of the present invention, is performed for comparing the estimated speed value $V_O$ calculated by the observer 30 with a detected speed value $V_S$ of an actual apparatus.

First, an estimated speed calculated by the observer 30 which is sampled and held in a register J (not shown) in synchronism with the generation of the previous pulse $X_P$ is designated by $V_J$. The held value $V_J$ is then shifted to another register (not shown) in synchronism with the generation of the next pulse $X_P$ and held therein as a held value $V_K$. Next, the estimated speed $V_O$ calculated by the observer 30 is sampled and held in the register J as the held value $V_J$. (This processing corresponds to the processings at steps 214 and 217 in FIG. 7.)

Next, at step F65, the held values $V_J$ and $V_K$ are averaged to derive $V_H$ (corresponding to the processing at step 218 in FIG. 7) which is then compared with the detected speed value $V_S$ to calculate an estimation error $e_r$ by the observer 30 as expressed by the following equation (corresponding to the processing at step 219 in FIG. 7):

$$e_v = V_H - V_S$$

At the next step F70, the observer 30 is adjusted by the use of the estimation error $e_v$ (which corresponds to the processings at steps 205, 207, 208 and 221 in FIG. 7).

In the present embodiment, an observer generates a signal indicating an estimated speed with a small delay and a high absolute accuracy of the signal. This estimated value can thus be used in a servo system to achieve a fast and highly accurate speed control of a magnetic tape.

Figure 11:
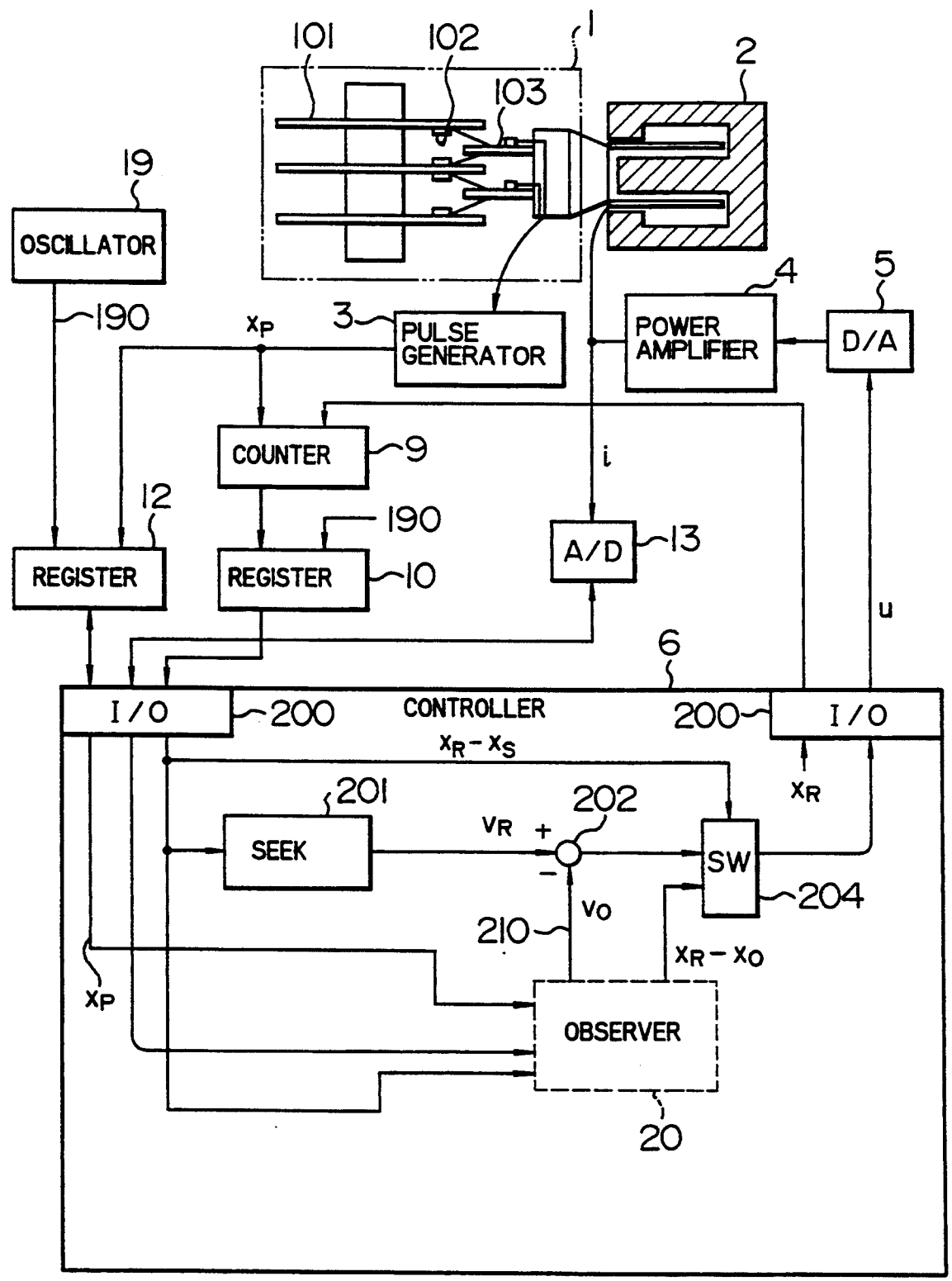
FIG. 11 is a block diagram illustrating the configuration of a servo system embodying a servo control method according to the present invention.

FIG. 11 illustrates an embodiment which uses a magnetic disk drive as the load 1 of FIG. 3. The load 1 comprises a disk stack 101 including a plurality of stacked magnetic disks, magnetic heads 102 for detecting track signals recorded concentrically on the respective disks in the disk stack 101, and a carriage 103 for supporting the magnetic heads 102. In this embodiment, a motor 2 is of a voice coil type which provides a linear motion and used to drive the carriage 103 to position the magnetic heads 102 on a plurality of track signals on the disc stack 101. At this time, the magnetic heads 102, while moving, pass over the concentrically formed track signals, whereby a pulse generator 3 generates a pulse signal $X_P$ indicative of the track signal.

Figure 20:
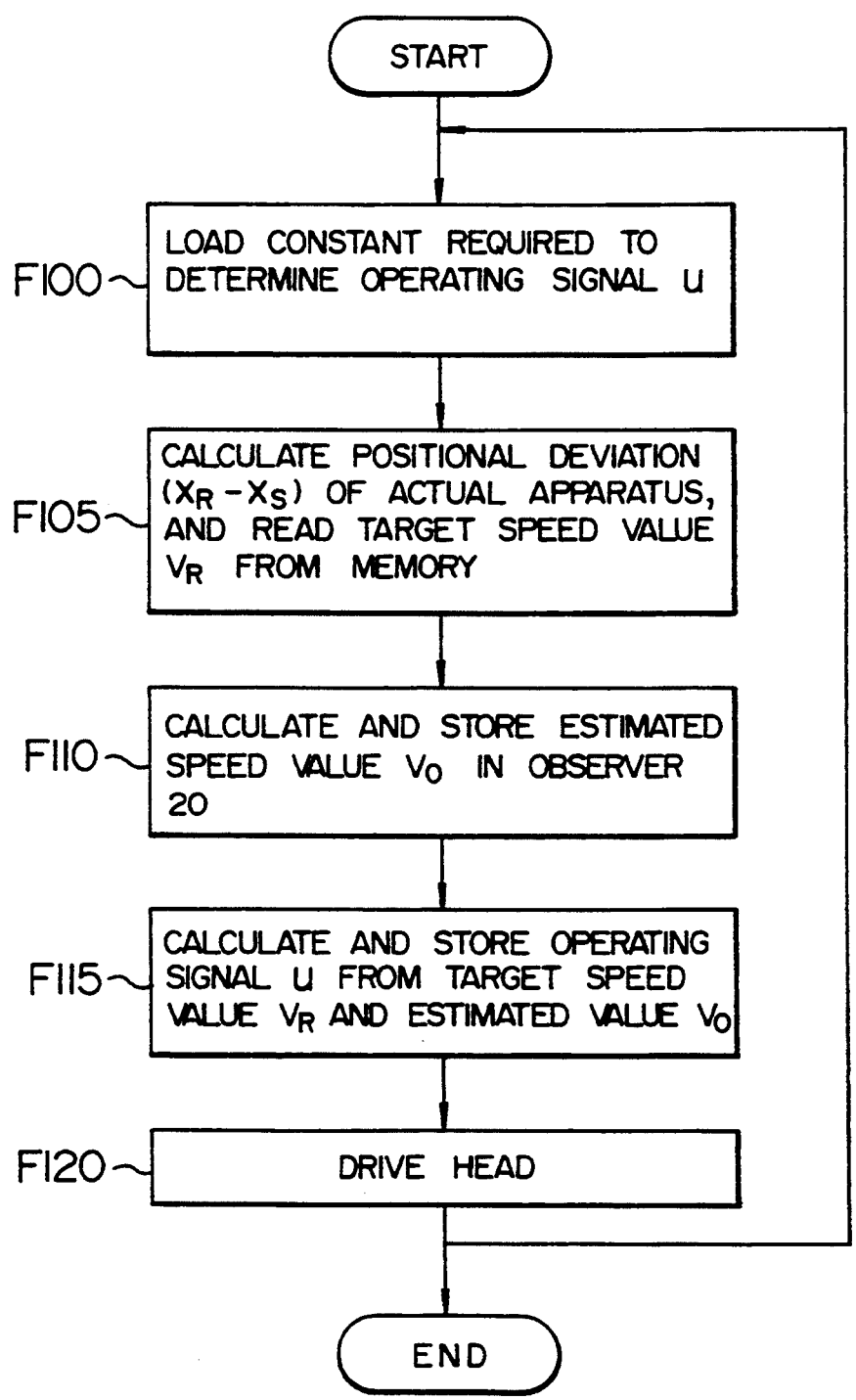
FIG. 20 is a flow chart illustrating the operation of a position control for a magnetic disk drive.

The operation of the apparatus shown in FIG. 12 will hereinbelow be described with reference to FIGS. 20 and 21. FIG. 20 is an operational flow chart illustrating the operation of the controller 6 during one sample period.

First, a processing at step F100 in FIG. 20 is executed. Specifically, a constant required to determine an operating signal u to a motor in the magnetic disk drive is extracted from a memory having such constants stored therein and loaded.

Then, the flow proceeds to step F105 where a positional deviation ($X_R - X_S$) due to a movement of the heads is detected, and a target speed value $V_R$ is read out based on the detected ($X_R - X_S$). The position detector is composed of the pulse generator 3 and a counter 9. The counter 9 counts the pulse signal $X_P$ to detect the positional deviation ($X_R - X_S$) from the current position $X_S$ to a target position $X_R$. Its output is stored in a register 10 and read by the controller 6 through an I/O port 200. The target speed value $V_R$ is stored as a function of the positional deviation ($X_R - X_S$) so as to be read out by using ($X_R - X_S$).

Next, at step F110, the observer 20 calculates and stores an estimated speed value $V_O$. This operation has been described in detail as the processings at steps 206–215 in FIG. 1.

Then, the flow proceeds to step F115 to calculate and store the operating signal u required to move the heads in accordance with the target speed $V_R$. The operating signal u is calculated on the basis of the following equation (4):

$$u = G_3 K_1 (V_R = V_O) \tag{4}$$

where

G₃: a gain constant of the magnetic disk mechanical structure
K₁: a speed gain
$V_R$: the speed target value
$V_O$: an estimated speed calculated by the observer 20

Subsequently, the flow proceeds to step F120 where the controller 6 outputs the operating signal u to the output port 200 for driving the motor 2.

The operation for calculating an estimated speed value $V_O$ in the observer 20 will hereinbelow be described with reference to FIG. 21.

Figure 21:
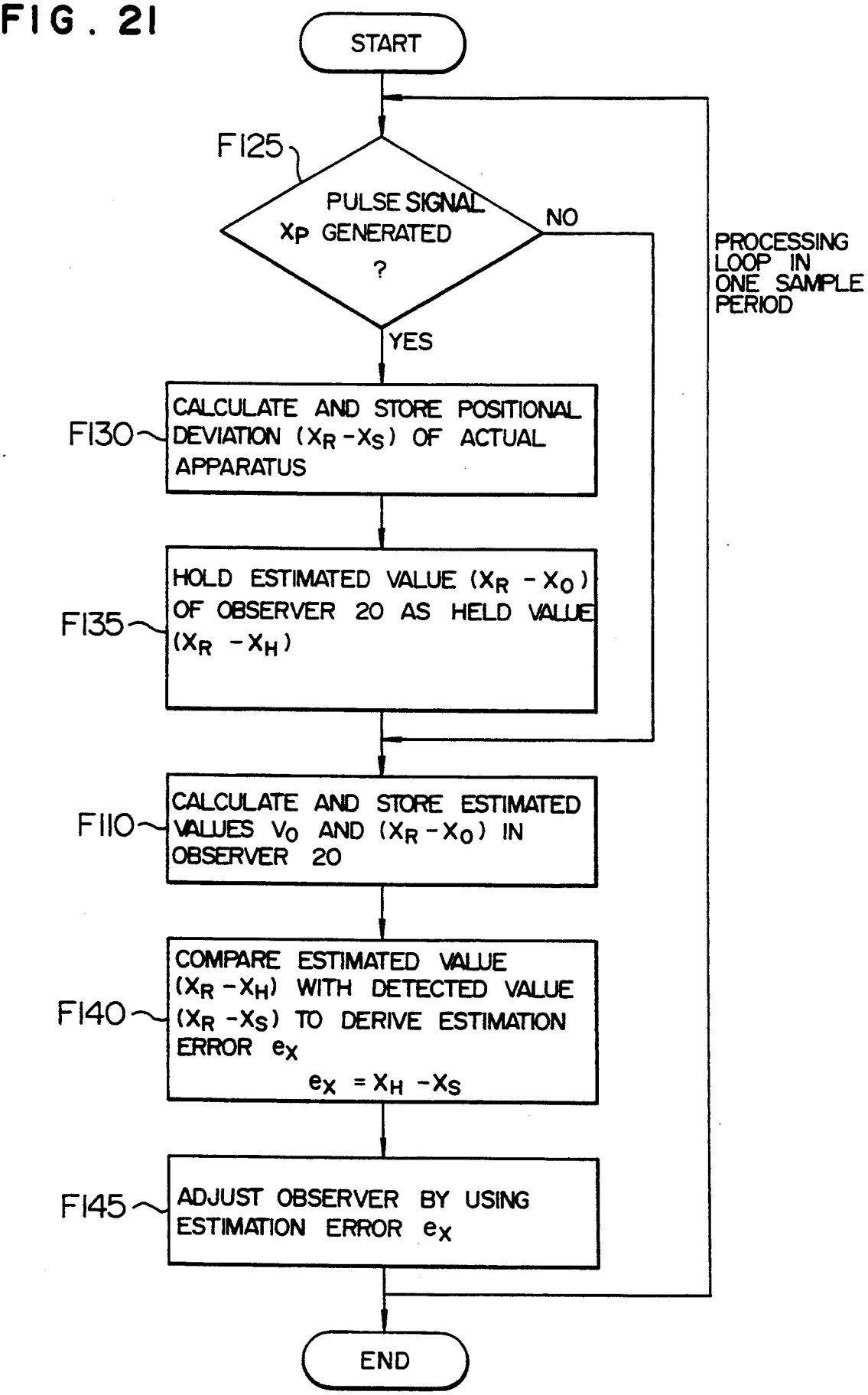
FIG. 21 is a flow chart illustrating a calculation of an estimated speed value.

First, a processing at step F125 in FIG. 21 is executed. The controller 6 monitors, once per sample period, the generation of the pulse signal $X_P$ from the pulse generator 3 caused by a movement of the heads of the magnetic disk drive.

When the pulse signal $X_P$ is generated, processings at steps F130 and F135 are executed only at this time, and then processings at steps F110, F140 and F145 are executed. When the pulse signal $X_p$ is not generated, the processings at steps F130 and F135 are bypassed.

A processing at the next step F130 detects a positional deviation $(X_R-X_S)$ due to a movement of the heads, which is partially the same as the processing at step F105, previously explained in connection with FIG. 20. This processing is present again in FIG. 21 as step F130 for clarifying the processing timing.

Next, at step F135, a synchronous sampling and holding processing, which constitutes a feature of the present invention, is performed for comparing the estimated value $(X_R-X_O)$ calculated by the observer 20 with the detected actual value $(X_R-X_S)$, and a held value $(X_R-X_H)$ is calculated in synchronism with the generation of the pulse signal $X_P$.

A processing at the next step F110 calculates and stores estimated values $V_O$ and $(X_R-X_O)$, which corresponds to the processings at steps 206-215 in FIG. 1.

Then, at step F140, the held value $(X_R-X_H)$ is compared with the detected value $(X_R-X_S)$ to calculate an estimation error $e_x$ by the following equation:

$$e_x = X_H - X_S$$

This processing corresponds to the processing at step 215 in FIG. 1.

At the next step F145, the observer 20 is adjusted by the use of the estimation error $e_x$. This processing corresponds to the processings at steps 207, 208, 210 and 211 in FIG. 1.

In the present embodiment, the observer generates a signal indicating an estimated value with few delay and a high absolute accuracy of the signal. This estimated value can thus be used in a servo system to achieve a fast and highly accurate positioning control of the magnetic heads.

Figure 12:
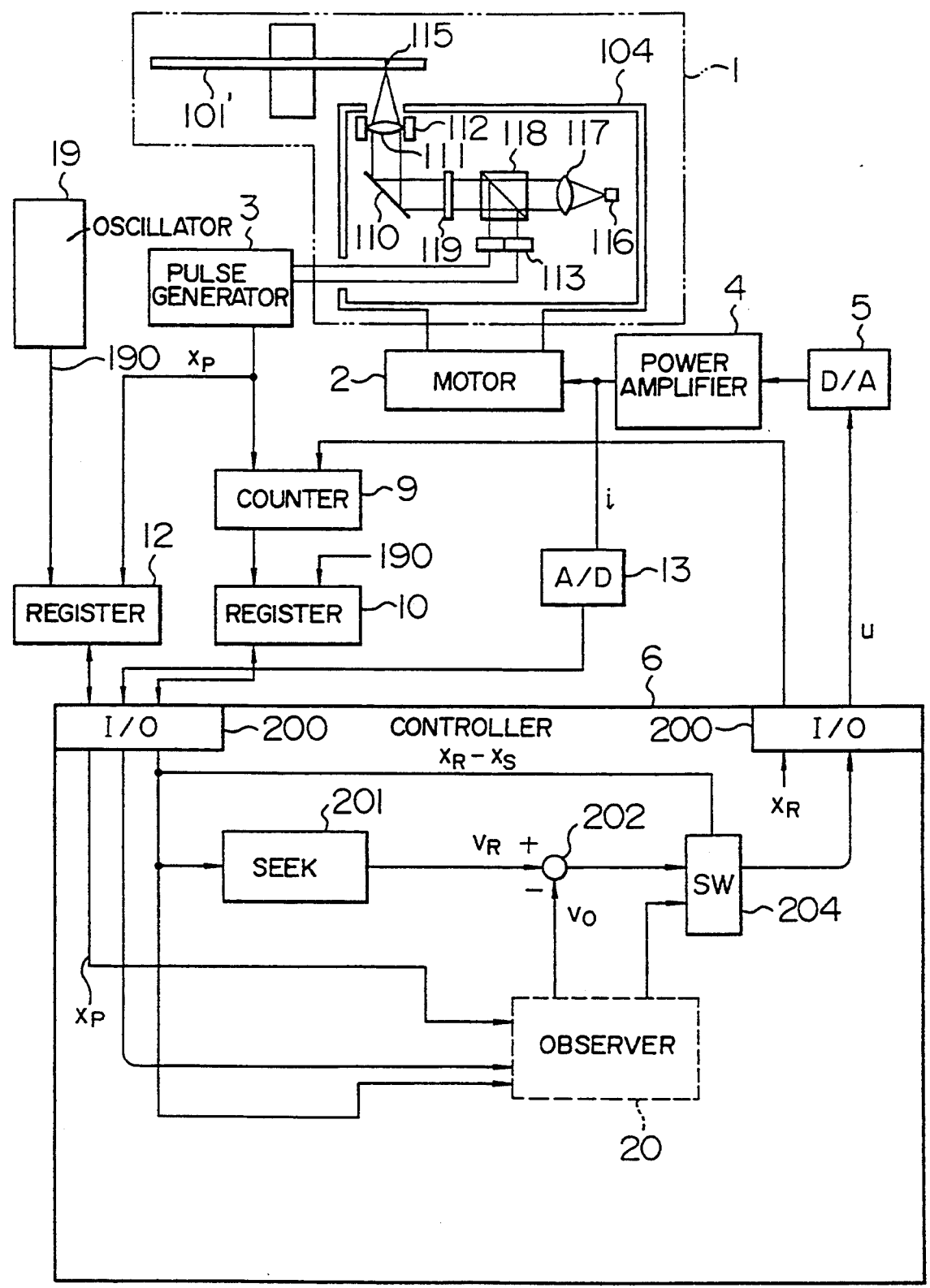
FIG. 12 is a block diagram illustrating the configuration of a servo system embodying a servo control method according to the present invention.

FIG. 12 illustrates an embodiment which uses an optical disk drive as the load 1 of FIG. 3. The load 1 comprises an optical disk 101' and an optical head 104 for detecting a track formed of a high density pit train concentrically or spirally formed on optical disk 101'. A motor 2 of the present embodiment, which is of a voice coil type providing a linear motion, drives and positions the optical head 104 above the track formed on the optical disk 101'. In this event, the optical head 104, during its movement, passes over the concentrically or spirally formed track, whereby a pulse generator 3 generates a pulse signal $X_p$ indicative of the track. The optical head 104 comprises a light source 116, a collimator lens 117, a polarizing beam splitter 118, a quarter wavelength plate 119, an optical path changing mirror 110, an objective lens 111, and a two-part divided optical detector 113 for detecting light reflected from an optical spot 115 formed on optical disk 101'. Incidentally, comparing an optical disk drive with a magnetic disk drive, these two drives are different in the structure of heads for inputting and outputting signals with a disk which stores information, the weight of a carriage for mounting the heads thereon, and a mechanical structural constant such as a constant of a motor for moving the carriage, whereas, they are the same in the operation for moving the carriage to position the same on an arbitrary location on a disk. Thus, since a positioning operation flow of the optical disk drive is similar to that of the magnetic disk drive previously explained in connection with FIGS. 20, 21, an explanation thereof will be omitted.

In the present embodiment, the observer generates signals indicating an estimated speed and an estimated position with a small delay and a high absolute accuracy of the signal. This estimated value can thus be used in a servo system to achieve a fast and highly accurate positioning control of the optical head.

Figure 14:
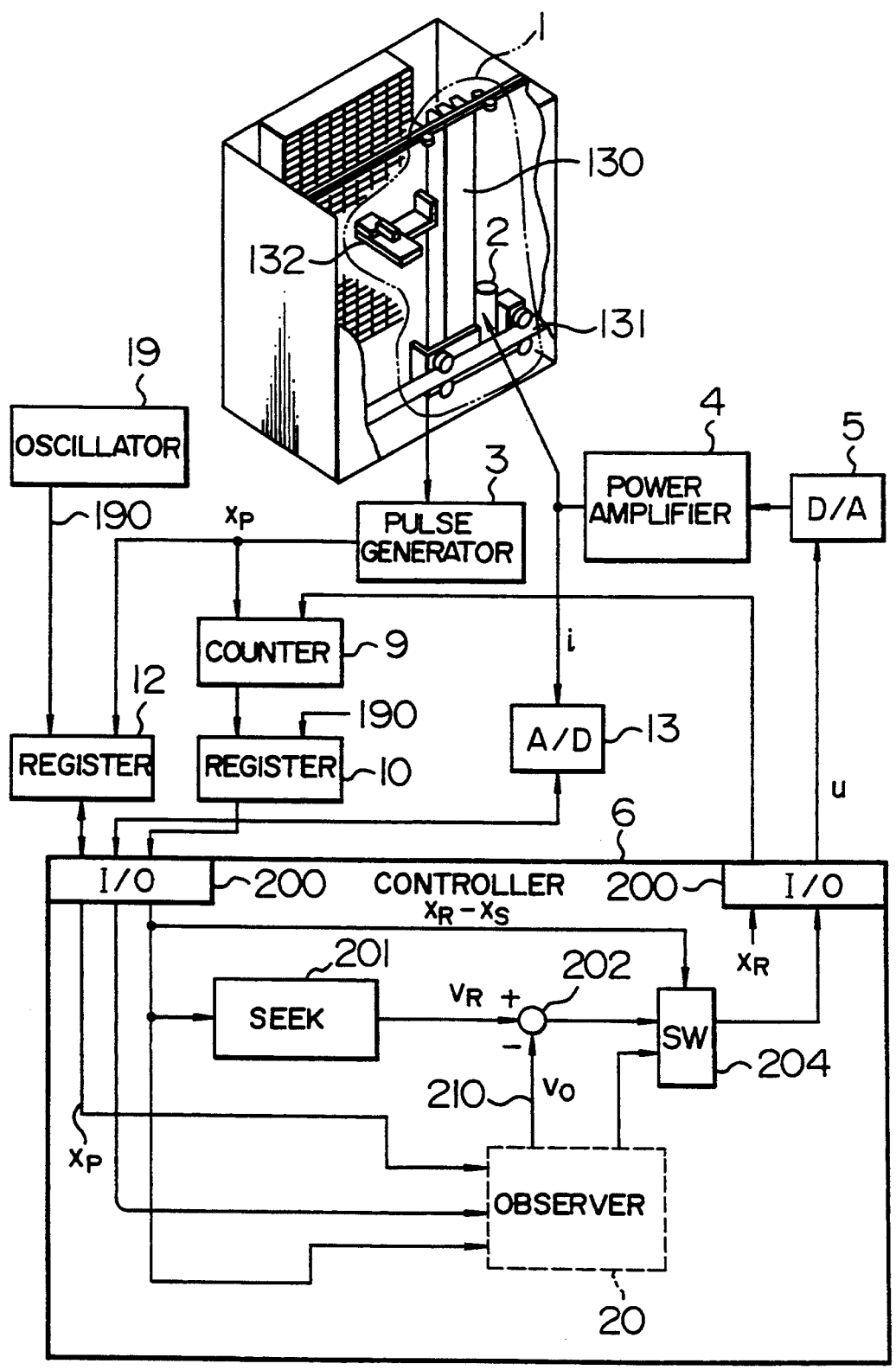
FIG. 14 is a block diagram illustrating the configuration of a servo system embodying a servo control method according to the present invention.

FIG. 14 illustrates an embodiment which has a part transporting apparatus as the load 1 of FIG. 3. The load 1 comprises a transporting rail 131, a carriage 130 which moves horizontally on the rail 131, and a part carrier 132. A motor 2 drives the carriage 130 in the horizontal direction through a deceleration gear (not shown). A pulse generator 3 generates a pulse signal $X_P$ when the carriage 130 passes a central position of a part shelf.

In the present embodiment, an observer generates a signal indicating an estimated speed with a small delay and a high absolute accuracy of the signal. This estimated value can thus be used in a servo system to achieve a fast and highly accurate positioning control of a transporting robot.

FIG. 15 is a block diagram illustrating the configuration of a further embodiment of the present invention. This embodiment differs from the embodiment of FIG. 1 in that the function of the position detector is realized by software implemented in the controller 6. A processing at 230 within the controller 6 carries out the function of the counter 9 in the embodiment of FIG. 1. Specifically, this processing calculates an accumulated value of a pulse signal $X_P$ inputted through an I/O port 200. This position detection processing is provided for detecting an positional deviation $(X_R-X_S)$ from a current position $X_S$ to a target position $X_R$, where the target position $X_R$ is preset as an initial value of the processing at 230. The result of the processing at 230 is used in subsequent processings at 210, 204 and 231, similarly to the embodiment of FIG. 1. The processing at 231 in this embodiment executes the processings at 214 and 215 of the embodiment of FIG. 1 in combination.

The processing at 231 is executed in synchronism with the generation of every pulse of the pulse signal $X_P$. Specifically, when the positional deviation $(X_R-X_{XS})$ at the current position is determined in the processing at 230, an error in an estimated value generated by an observer 20 is calculated and held by the processing at 231 at this timing.

The calculation of an error in the estimated value generated by the observer 20 is performed by subtracting the output result $(X_R-X_O)$ of the processing at 213 from the positional deviation $(X_R-X_S)$ as a calculation for deriving the foregoing $(X_O-X_S)$.

The result of the processing at 231 is used in a sequence of processings at 207, 208, 210 and 211 for performing an adjustment for reducing an error in an estimated value generated by the observer 20.

The basic configuration of the present invention is a condition amount detector for detecting a condition amount of an object to be controlled which is characterized by comprising a pulse generator provided in this object to be controlled for converting a displacement of the object to be controlled to an electric signal; a detector circuit for outputting an output of the pulse generator to the outside as a detected value; a model constituted of an electronic circuit having a signal propagation characteristic corresponding to the object to be controlled; and a synchronized sampler for extracting an estimated condition amount value, which is an output of the model, at the time the pulse generator is detected.

The condition amount used herein refers to a speed, position or the like of an object to be controlled. The present invention aims at more exactly acquiring such a condition amount.

An object of synchronization is to extract an estimated condition amount value, which is an output of the model, by the synchronized sampler at the time of detecting the output of the pulse generator, so as to adjust the model when a deviation and/or an initial value error are present between the object to be controlled and a control parameter of the model. The inventors refer to such a circuit provided with the model and the synchronized sampler as a synchronized observer.

Figure 16:
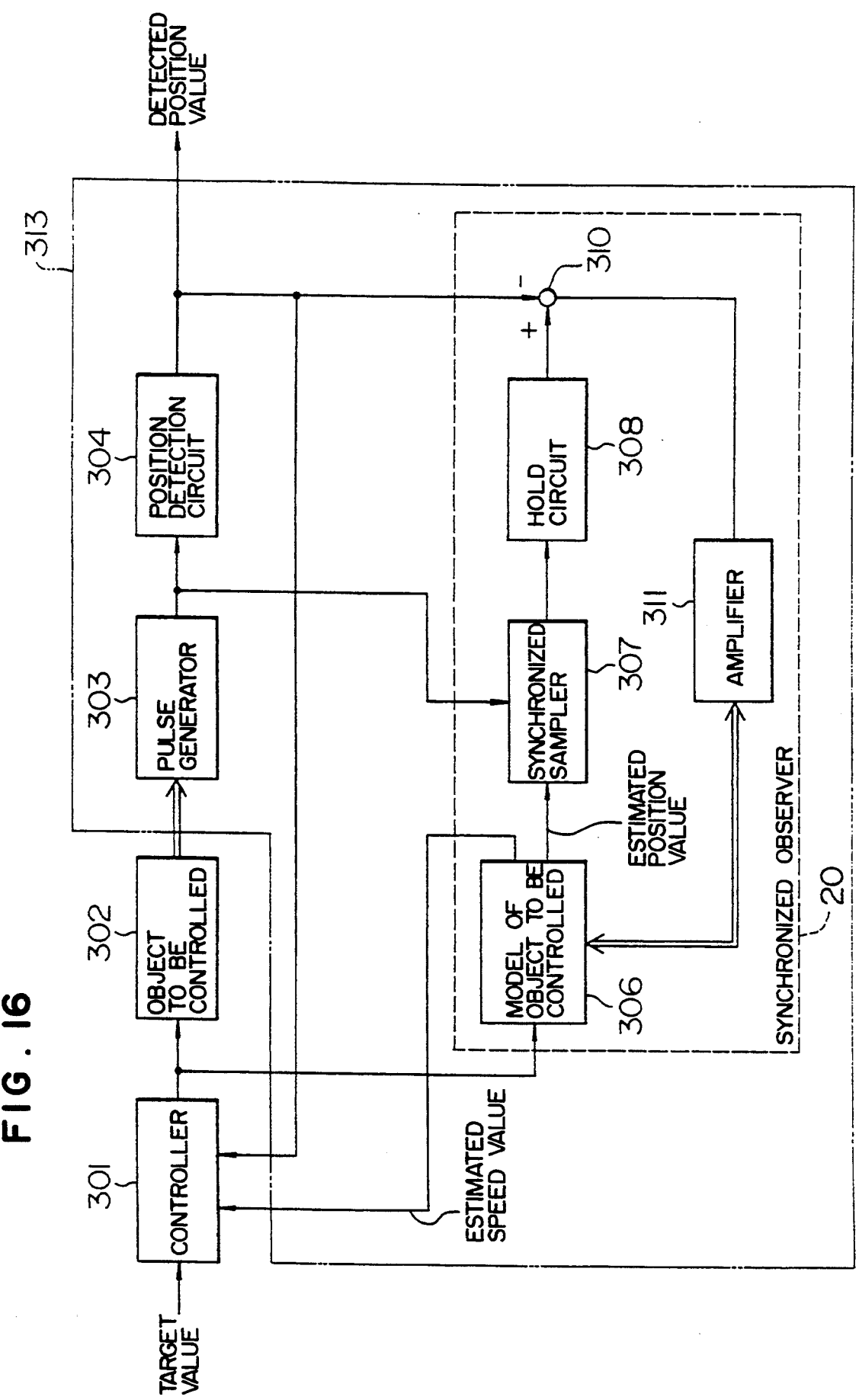
FIG. 16 is a block diagram illustrating the configuration of a position control apparatus according to the present invention.

Now, description will be made as to an example of a position control apparatus using a synchronized observer 20, which constitutes a feature of the present invention, with reference to the accompanying drawings. In FIG. 16, reference numeral 301 designates a controller, 302 an object to be controlled, and 303 a pulse generator. A pulse signal from the pulse generator 303 is inputted to a position detector circuit 304 which detects a position value. The synchronized observer 20 in turn is composed of a model 306 of the object to be controlled, a synchronized sampler 307, a hold circuit 308, an adder 310 and an amplifier 311. The model 306 of the object to be controlled is constituted of an electronic circuit so as to have the same signal propagation characteristic as the object to be controlled 302. In the model 306 of the object to be controlled, by inputting the same input signal as that inputted to the object to be controlled 302, an estimated speed value and an estimated position value of the object to be controlled are calculated. The estimated position value calculated by the model 306 of the object to be controlled is inputted to the synchronized sampler 307 and sampled (extracted) thereby in synchronism with the pulse signal from the pulse generator 303. The sampled value is temporarily held in the hold circuit 308 until the next pulse signal is generated from the pulse generator 303. Then, a deviation (estimation error) between the detected position value by the position detector circuit 304 and an output of the hold circuit 308 is calculated by the adder 310 and fed back to the model 306 of the object to be controlled through the amplifier 311. As a result, the estimated position value calculated by the synchronized observer gradually approaches the detected position value of the object to be controlled 302. After the estimated value has been close to the detected value, the estimated speed value without phase delay is extracted from the synchronized observer 20 (exactly from the model 306 of the object to be controlled) and used as a feedback signal to the controller 301, thereby making it possible to improve the stability of the position control apparatus.

The operation of the thus constructed position control apparatus will hereinbelow be described. The position detector circuit 304 counts the pulse signal from the pulse generator 303 and outputs its accumulated value as a detected position value, which results in generating a quantized step-like signal which is updated each time the pulse signal is generated from the pulse generator 303. An estimated position value estimated by the synchronized observer 20 is converted by the synchronized sampler 307 and the hold circuit 308 to a quantized detected position value similar to that actually detected by the position detector circuit 304. Specifically, since the estimated position signal is quantized in synchronism with the pulse signal from the pulse generator 303, the deviation detected by the adder 310 has noises due to the quantization removed therefrom and therefore presents a true estimation error, which results in improving the position estimation accuracy of the synchronized observer. Also, as a result of exactly detecting the position, the speed is also estimated exactly. A gain of the amplifier 311 of the synchronized observer is a value for determining a speed at which the estimated position value of the synchronized observer is brought close to the detected position value of the object to be controlled.

Figure 17:
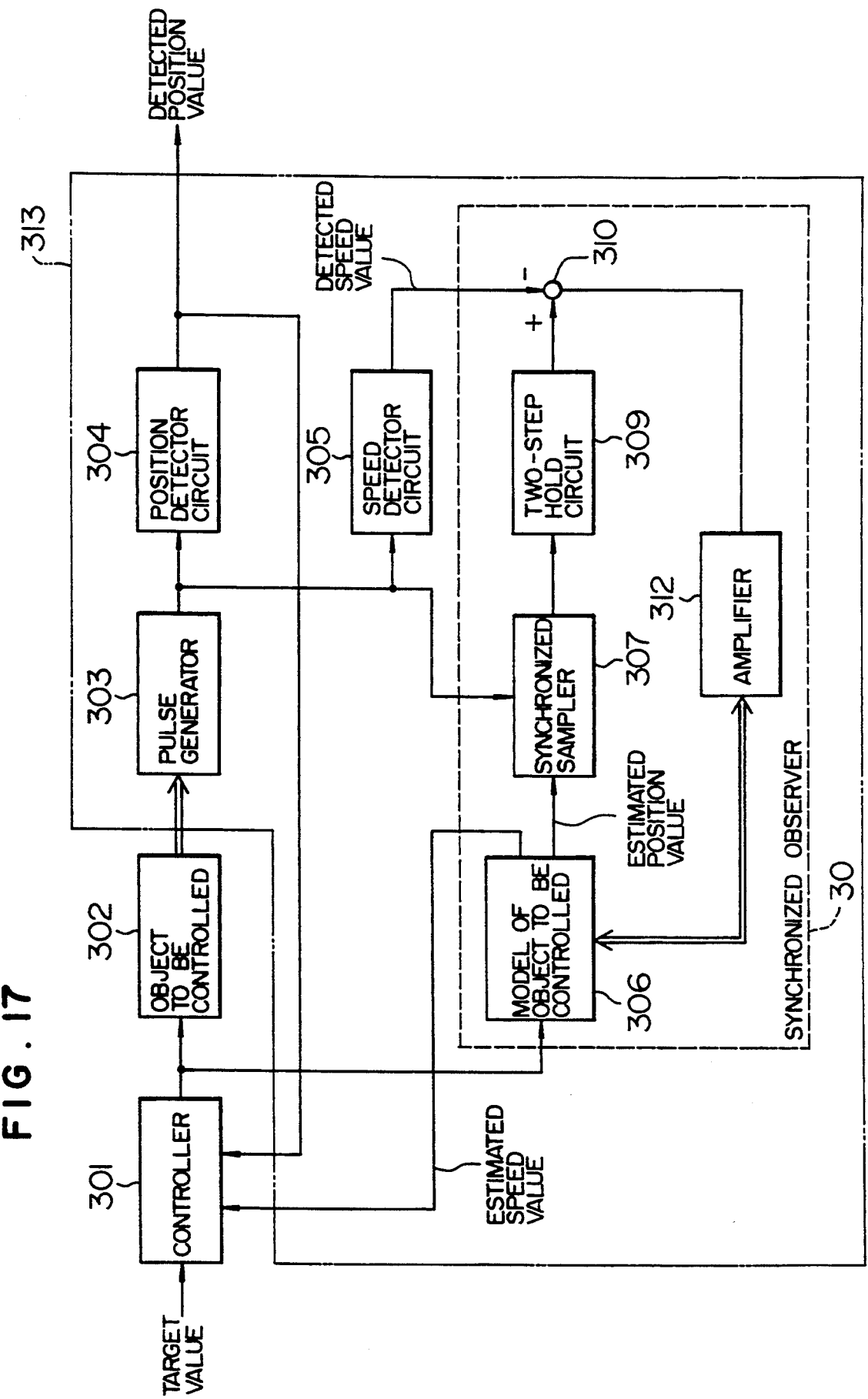
FIG. 17 is a block diagram illustrating the configuration of a position control apparatus of the present invention.

FIG. 17 illustrates an alternative of the present example. The configuration of FIG. 17 differs from that of FIG. 16 in that the position detector 304 is also provided with a speed detector circuit 305. Also, a hold circuit 309 is a two-step hold circuit, and reference numeral 312 designates an amplifier. The two-step hold circuit is employed because the speed detector circuit is used.

It is further effective to integrate these circuits in a single LSI 313 and provide the same for the object to be controlled 302.

Incidentally, the sampler-hold called herein is composed of the hold circuit 308 and the synchronized sampler 307. Also, the object to be controlled 302 and the pulse generator 303 are in general coupled mechanically.

In the present embodiment, since the function of the position detector is realized by software, it is possible to eliminate overflow of a counter which may occur if such a function is implemented by hardware, and consequently to apply the method of the present invention to a servo system which involves a long distance of movement.

In the foregoing embodiment, although explanation has been given of a typical apparatus to which the present invention is applied, the present invention is not limited to these applications but can be widely used in apparatus using an encoder. For example, in a business machine field, the present invention can be applied to a daisy wheel control of a print-type type-writer and a transport timing control of a carriage motor for a type-writer, a daisy wheel control and a carriage motor control for a printer, an optical-system motor control for reduction and magnification of a copy machine, a constant speed control of an optical motor for a facsimile, and so on. In a field of computer peripheral machines, the present invention can be applied to, in addition to the magnetic disk drive described in the aforementioned embodiment, a pen coordinate detection for an X-Y plotter, a detection of a moving amount and a moving direction of a track ball for a mouse, and so on, while in a working machine field, it can be applied to a detection of a table moving amount for an NC apparatus, a detection of a moving amount for a linear scale, and so Further, the present invention can be applied, in a measurement machine field, to an angle control of a tracking turn table for a monitor TV camera and a displacement detection of a spring of a scale for an electronic scale, and in an electric household machine field, to a constant rotational speed control of a capstan motor for a VTR, a position control of a pattern sewing motor for a sewing machine, a rotation control of a turn table of a DD (direct drive) player for a record player, and so on.

It is moreover possible to apply the present invention to a position and angle control of arms and articulations for an industrial robot.

The present invention is employed in a servo system which uses a signal relative to a discrete position to eliminate drawback caused by a time delay (a phase delay produced in a speed signal) occurring in course of a speed detection due to the discrete nature of the positional information, whereby a positioning to a target position can be accomplished in a short time.

What is claimed is:

1. A servo control method comprising the steps of:
controlling a motor so as to reduce a difference between a target position and an estimated position value generated by an observer; and
adjusting said observer in accordance with a difference between a detected position value which is derived discretely and said estimated position value so as to adjust said estimated position value to reduce the difference between said detected position value and said estimated position value;
wherein said estimated position value is synchronized with a timing of a position detection.

2. A servo control method for performing a positional control of a load using an estimated position value generated by an observer, the servo control method comprising the steps of:
holding the estimated position value generated by the observer at a timing of a pulse signal at which a position detection is performed; and
adjusting said observer on the basis of a difference between said held estimated position value and a detected position value derived at a time at which said estimated position value was held so as to adjust said estimated position value to reduce the difference.

3. A servo control method for a servo system, the servo system including means for detecting a discrete position signal and a controller implemented to have a propagation characteristic of a servo apparatus such that said controller serves as an observer for the servo apparatus, the servo control method comprising the steps of:
externally synchronizing said observer with an output of said detecting means;
adjusting said observer so as to adjust a position signal generated by said observer; and
extracting a continuous position signal from said observer to interpolate said discrete position signal.

4. A servo control method for a servo system, the servo system including position signal detecting means, speed detecting means, and a controller constructed to have a propagation characteristic of a servo apparatus such that said controller serves as an observer for the servo apparatus, the servo control method comprising the steps of:

extracting a speed signal from said observer in synchronism with a time at which a position signal is generated by said position signal detecting means;
adjusting said observer so as to adjust said speed signal extracted from said observer to reduce a difference between the speed signal extracted from said observer and an actual speed detected by said speed detecting means; and
extracting a continuous position signal from said observer to control the servo system.

5. A servo control system for a servo system, the servo system including position signal detecting means, means for detecting a positional deviation from a target value, and a controller constructed to have a propagation characteristic of a servo apparatus such that said controller has a function of an observer for the servo apparatus, the servo control method comprising the steps of:
extracting a positional deviation from a target value set in said observer in synchronism with a time at which a position signal is generated by said position signal detecting means;
comparing said extracted positional deviation with a positional deviation detected by said positional deviation detecting means and adjusting said observer so as to adjust said extracted positional deviation reduce a difference between said extracted positional deviation and said detected positional deviation; and
extracting a continuous position signal from said observer to interpolate a discontinuous position signal.

6. A servo control method for a servo system comprising means for detecting a track signal discretely recorded on a disk, means for detecting a track deviation from a target track, and a controller constructed to have the propagation characteristic of a magnetic disk drive such that said controller serves as an observer for the magnetic disk drive, comprising the steps of:
extracting a track deviation from a target track set in said observer in synchronism with a time at which a track signal is generated by said track signal detecting means;
comparing said extracted track deviation with a track deviation detected by said track deviation detecting means and adjusting said observer so as to adjust said extracted track deviation to reduce a difference between said extracted track deviation and said detected track deviation; and
extracting a continuous position signal and a speed signal from said observer to interpolate the track signal.

7. A servo control method for a servo system comprising means for detecting a track signal discretely recorded on an optical disk, means for detecting a track deviation from a target track, and a controller constructed to have the propagation characteristic of an optical disk drive such that said controller serves as an observer for the optical disk drive, comprising the steps of:
extracting a track deviation from a target track set in said observer in synchronism with a time at which a track signal is generated by said track signal detecting means;
comparing said extracted track deviation with a track deviation detected by said track deviation detecting means and adjusting said observer so as to adjust said extracted track deviation to reduce a difference between said extracted track deviation and said detected track deviation; and extracting a continuous position signal and a speed signal from said observer to interpolate the track signal.

8. A servo control method for a servo system comprising means for detecting a discrete position signal generated at intervals of a predetermined tape transporting amount, speed detecting means, and a controller constructed to have the propagation characteristic of a magnetic tape drive such that said controller serves as an observer for the magnetic tape drive, comprising the steps of:

detecting a speed estimated by said observer in synchronism with a time at which a position signal is generated by said position signal detecting means;

comparing said speed estimated by said observer with a speed detected by said speed detecting means and adjusting said observer so as to adjust said speed estimated by said observer to reduce a difference between said speed estimated by said observer and said speed detected by said speed detecting means; and extracting a continuous speed signal from said observer.

9. A servo control method for a servo system comprising means for detecting a discretely recorded position signal, means for detecting a positional deviation from a target value, and a controller constructed to have the propagation characteristic of a part transporting robot such that said controller serves as an observer for the part transporting robot, comprising the steps of:

extracting a positional deviation from a target value set in said observer in synchronism with a time at which a position signal is generated by said position signal detecting means;

comparing said extracted positional deviation with a positional deviation from the target value detected by said positional deviation detecting means and adjusting said observer so as to adjust said extracted positional deviation to reduce a difference between said extracted positional deviation and said detected positional deviation; and extracting a continuous position signal and a speed signal from said observer.

10. A servo control method for a servo system comprising means for detecting a discretely recorded position signal, speed detecting means, and a controller constructed to have the propagation characteristic of a servo apparatus such that said controller serves as an observer for the servo apparatus, comprising the steps of:

adjusting said observer in synchronism with a time at which a position signal is generated by said position signal detecting means so as to adjust a speed signal generated by said observer;

extracting a continuous speed signal from said observer; and selectively employing said continuous speed signal and a speed signal detected by said speed detecting means to control said servo apparatus.

11. A servo control method for a servo system comprising means for detecting a discretely recorded position signal, speed detecting means, and a controller constructed to have the propagation characteristic of a servo apparatus such that said controller serves as an observer for the servo apparatus, comprising the steps of:

adjusting said observer in synchronism with a time at which a position signal is generated by said position signal detecting means so as to adjust a position signal and a Speed signal generated by said observer; and extracting a continuous position signal and a speed signal from said observer to interpolate said discrete position signal.

12. An apparatus for detecting a condition amount of an object to be controlled, comprising:

a pulse generator provided in the object to be controlled for converting a displacement of the object to be controlled into an electric signal;

a detector circuit for outputting an output of said pulse generator as a detected value;

a model constituted by an electric circuit having a signal propagation characteristic corresponding to said object to be controlled; and a synchronized sampler for extracting an estimated value of a condition amount which forms an output of said model at the time of the detection of said pulse generator.

13. An apparatus for detecting a condition amount according to claim 12, wherein said pulse generator, said detector circuit, said model, and said synchronized sampler are integrated in a single LSI.

14. A servo control method for controlling a motor comprising the steps of:

controlling a motor based on an estimated speed obtained by an observer so as to reduce a difference between a target position and a detected value obtained discretely; and adjusting the observer in accordance with a difference between the detected value obtained discretely and an estimated position value obtained by the observer so as to adjust the estimated position value to reduce the difference between the detected value obtained discretely and the estimated position value;

wherein the estimated position value is synchronized with a timing of a position detection.

15. A servo control method for performing a positional control of a load based on an estimated position value obtained by an observer, the method comprising the steps of:

holding the estimated position value obtained by the observer at a timing of a pulse signal at which a position detection is performed; and adjusting the observer based on a difference between the held estimated position value and a detected position value derived at the time at which the estimated position value was held so as to adjust the estimated position value to reduce the difference.

16. A servo control method for a servo system, the servo system including means for detecting a discrete position signal and a controller having a same propagation characteristic as a servo apparatus such that the controller serves as an observer for the servo apparatus, the method comprising the steps of:

externally synchronizing the observer with an output of the detecting means;

adjusting the observer so as to adjust a position signal obtained by the observer;

extracting a continuous position signal from the observer so as to interpolate the discrete position signal; and controlling the servo system based on the interpolated discrete position signal.

17. A servo control method for a servo system, the servo system including position signal detecting means, speed detecting means, and a controller having a propagation characteristic as a servo apparatus such that the controller serves as an observer for the servo apparatus, the method comprising the steps of:
  extracting a speed signal from the observer in synchronism with a time at which a position signal is generated by the position signal detecting means;
  adjusting the observer so as to adjust the speed signal extracted from the observer to reduce a difference between the speed signal extracted from the observer and an actual speed detected by the speed detecting means; and
  extracting a continuous signal from the observer for controlling the servo system.

18. A servo control method for a servo system, the servo system including position signal detecting means, means for detecting a positional deviation from a target value, and a controller having a same propagation characteristic as a servo apparatus such that the controller serves as an observer for the servo apparatus, the method comprising the steps of:
  extracting a positional deviation from a target value set in the observer in synchronism with a time at which a discontinuous position signal is generated by the position signal detecting means;
  comparing the extracted positional deviation with a positional deviation obtained by the positional deviation detecting means and adjusting the observer so as to adjust the extracted positional deviation to reduce a difference between the extracted positional deviation and the detected positional deviation;
  extracting a continuous position signal from the observer so as to interpolate the discontinuous position signal; and
  controlling the servo system based on the interpolated discontinuous position signal.

19. A servo control method for a magnetic disk drive, the magnetic disk drive including means for detecting a track signal discretely recorded on a disk, means for detecting a track deviation from a target track on the disk, and a controller having a same propagation characteristic as the magnetic disk drive such that the controller serves as an observer for the magnetic disk drive, the method comprising the steps of:
  extracting a track deviation from a target track set in the observer in synchronism with a time at which a track signal is generated by the track signal detecting means;
  comparing the extracted track deviation with a track deviation detected by the track deviation detecting means and adjusting the observer so as to adjust the extracted track deviation to reduce a difference between the extracted track deviation and the detected track deviation;
  extracting a continuous position signal and a speed signal from the observer so as to interpolate the track signal; and
  controlling the magnetic disk drive based on the interpolated track signal.

20. A servo control method for an optical disk drive, the optical disk drive including means for detecting a track signal discretely recorded on an optical disk, means for detecting a track deviation from a target track on the optical disk, and a controller having a same propagation characteristic as the optical disk drive such that the controller serves as an observer for the optical disk drive, the method comprising the steps of:
  extracting a track deviation from a target track set in the observer in synchronism with a time at which a track signal is generated by the track signal detecting means;
  comparing the extracted track deviation with a track deviation detected by the track deviation detecting means and adjusting the observer so as to adjust the extracted track deviation to reduce a difference between the extracted track deviation and the detected track deviation;
  extracting a continuous position signal and a speed signal from the observer so as to interpolate the track signal; and
  controlling the optical disk drive based on the interpolated track signal.

21. A servo control method for a magnetic tape drive, the magnetic tape drive including means for detecting a discrete position signal generated at intervals of a predetermined tape transporting amount, speed detecting means, and a controller having a same propagation characteristic as the magnetic tape drive such that the controller serves as an observer for the magnetic tape drive, the method comprising the steps of:
  detecting a speed estimated by the observer in synchronism with a time at which the discrete position signal is generated by the position signal detecting means;
  comparing the speed estimated by the observer with a speed detected by the speed detecting means and adjusting the observer so as to adjust the speed estimated by the observer to reduce a difference between the speed estimated by the observer and the speed detected by the speed detecting means;
  extracting a continuous speed signal from the observer; and
  controlling the magnetic tape drive based on the continuous speed signal.

22. A servo control method for a part transporting robot, the part transporting robot including means for detecting a discretely recorded position signal, means for detecting a positional deviation from a target value, and a controller having a same propagation characteristic as the part transporting robot such that the controller serves as an observer for the part transporting robot, the method comprising the steps of:
  extracting a positional deviation from a target value set in the observer in synchronism with a time at which a position signal is generated by the position signal detecting means;
  comparing the extracted positional deviation with the positional deviation from the target value detected by the positional deviation detecting means and adjusting the observer so as to adjust the extracted positional deviation to reduce a difference between the extracted positional deviation and the detected positional deviation;
  extracting an estimated value from the observer; and
  controlling the part transporting robot based on the estimated value.

23. A servo control method for a servo system, the servo system including means for detecting a discretely recorded position signal, speed detecting means, and a controller having a same propagation characteristic as a servo apparatus such that the controller serves as an observer for the servo apparatus, the method comprising the steps of:
- adjusting the observer in synchronism with a time at which a discrete position signal is generated by the position signal detecting means so as to adjust a position signal and a speed signal obtained by the observer;
- extracting a continuous position signal and a speed signal from the observer so as to interpolate the discrete position signal; and
- controlling the servo system based on the interpolated discrete position signal.

24. A servo control method comprising the steps of:
- controlling an object of control based on an estimated value obtained by an observer so as to reduce a difference between a target position and a detected value obtained discretely; and
- adjusting the observer in accordance with a difference between the detected value obtained discretely and the estimated value obtained by the observer so as to adjust the estimated value obtained by the observer to reduce the difference between the detected value obtained discretely and the estimated value obtained by the observer;
- wherein the estimated value is synchronized with a timing of a position detection.

25. A servo control method according to claim 24, wherein the step of adjusting the observer and the step of controlling the object of control so as to reduce the difference between the target position and the detected value obtained discretely are executed by a same controller.

26. A servo control method according to claim 24, wherein the step of adjusting the observer and the step of controlling the object of control so as to reduce the difference between the target position and the detected value obtained discretely are executed at a same sampling period.

27. A servo control method for a servo system, the servo system including means for detecting a discrete position signal, a controller having a same propagation characteristic as a servo apparatus, and an observer for the servo apparatus provided separately from the controller, the method comprising the steps of:
- externally synchronizing the observer with an output of the detecting means;
- adjusting the observer so as to adjust a position signal obtained by the observer; and
- extracting a continuous position signal from the observer so as to interpolate the discrete position signal.

28. A servo control method according to claim 27, wherein an operation of the controller and an operation of the observer are carried out at different sampling periods.

29. A servo control method for a servo system, the servo system including means for detecting a discrete position signal, wherein a load is controlled based on an estimated value estimated by an observer, the method comprising the step of:
- performing at least one of control of the servo system and operation of the observer at a sampling period shorter than a period of occurrence of the discrete position signal.

30. A servo control method for a servo system, the servo system including means for detecting a discrete position signal, wherein a load is controlled based on an estimated value estimated by an observer, the method comprising the step of:
- synchronizing an operation of servo control including the observer with the discrete position signal based on a clock signal generated by a clock signal generating device, the discrete position signal being generated at a period different from an operation period of the servo control including the observer.

31. A servo control method according to claim 30, wherein the synchronizing step is based on binary transition information of the clock signal.

32. A servo control method for a servo system, the servo system including means for detecting a discrete position signal, wherein a load is controlled based on an estimated value estimated by an observer, the method comprising the step of:
- adjusting the observer at a timing of one of a rise and a fall of the discrete position signal, the discrete position signal being generated at a period different from an operation period of servo control including the observer.

* * * * *